(12) United States Patent
Tanaka et al.

(10) Patent No.: US 6,278,445 B1
(45) Date of Patent: *Aug. 21, 2001

(54) COORDINATE INPUT DEVICE AND METHOD HAVING FIRST AND SECOND SAMPLING DEVICES WHICH SAMPLE INPUT DATA AT STAGGERED INTERVALS

(75) Inventors: Atsushi Tanaka, Yamato; Eisaku Tatsumi, Kawasaki; Shigeki Mori, Koshigaya; Katsuhiko Nagasaki, Ichikawa, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/697,278

(22) Filed: Aug. 27, 1996

(30) Foreign Application Priority Data

Aug. 31, 1995 (JP) ............ 7-223589
Sep. 22, 1995 (JP) ............ 7-268059
Oct. 11, 1995 (JP) ............ 7-262869

(51) Int. Cl.[7] .................................. G09G 5/00
(52) U.S. Cl. ........................... 345/178; 345/177
(58) Field of Search ............... 345/173, 174, 345/177, 178, 179; 178/18.01, 18.03, 18.05, 18.06, 19.01, 19.03

(56) References Cited

U.S. PATENT DOCUMENTS

| 4,510,568 | 4/1985 | Kishi et al. | 364/300 |
| 4,931,965 | 6/1990 | Kaneko et al. | 364/560 |
| 5,392,058 | * 2/1995 | Tagawa | 345/173 |
| 5,491,305 | * 2/1996 | Kawakami et al. | 345/179 |
| 5,684,277 | * 11/1997 | Tokioka et al. | 345/177 |

FOREIGN PATENT DOCUMENTS

| 0566263 | 10/1993 | (EP) | G06F/3/033 |
| 62-154078 | 7/1987 | (JP) | G06F/9/52 |
| 63-006619 | 1/1988 | (JP) | G06F/3/03 |
| 06223139 | 8/1994 | (JP) | G06F/15/60 |
| 62-223239 | 8/1994 | (JP) | G06F/15/60 |

OTHER PUBLICATIONS

"Computer Graphics: Principles and Practices", Foley, J.D. et al., 1990, Addison Wesley, USA XP000171930, p. 488, paragraph 11.2.2—p. 495, paragraph 11.2.4.

* cited by examiner

*Primary Examiner*—Vijay Shankar
(74) *Attorney, Agent, or Firm*—Fitzpatrick, Cella, Harper & Scinto

(57) ABSTRACT

A coordinate input device interpolates sampling data, using less input data and simpler computing. The input data (coordinate information indicative of an input trace) are sampled both with a predetermined cycle (Tn), and at the end of a predetermined time interval after the sampling of the cycle Tn is complete. As a result of the two different samplings, not only the coordinate point determined by the sampling of cycle Tn, but also information indicative of a tangent vector at each coordinate point on the input trace are obtained. The coordinate point and the associated tangent vector information are thus output, so that a trace more faithful to the input trace is obtained using fewer coordinate points.

15 Claims, 17 Drawing Sheets

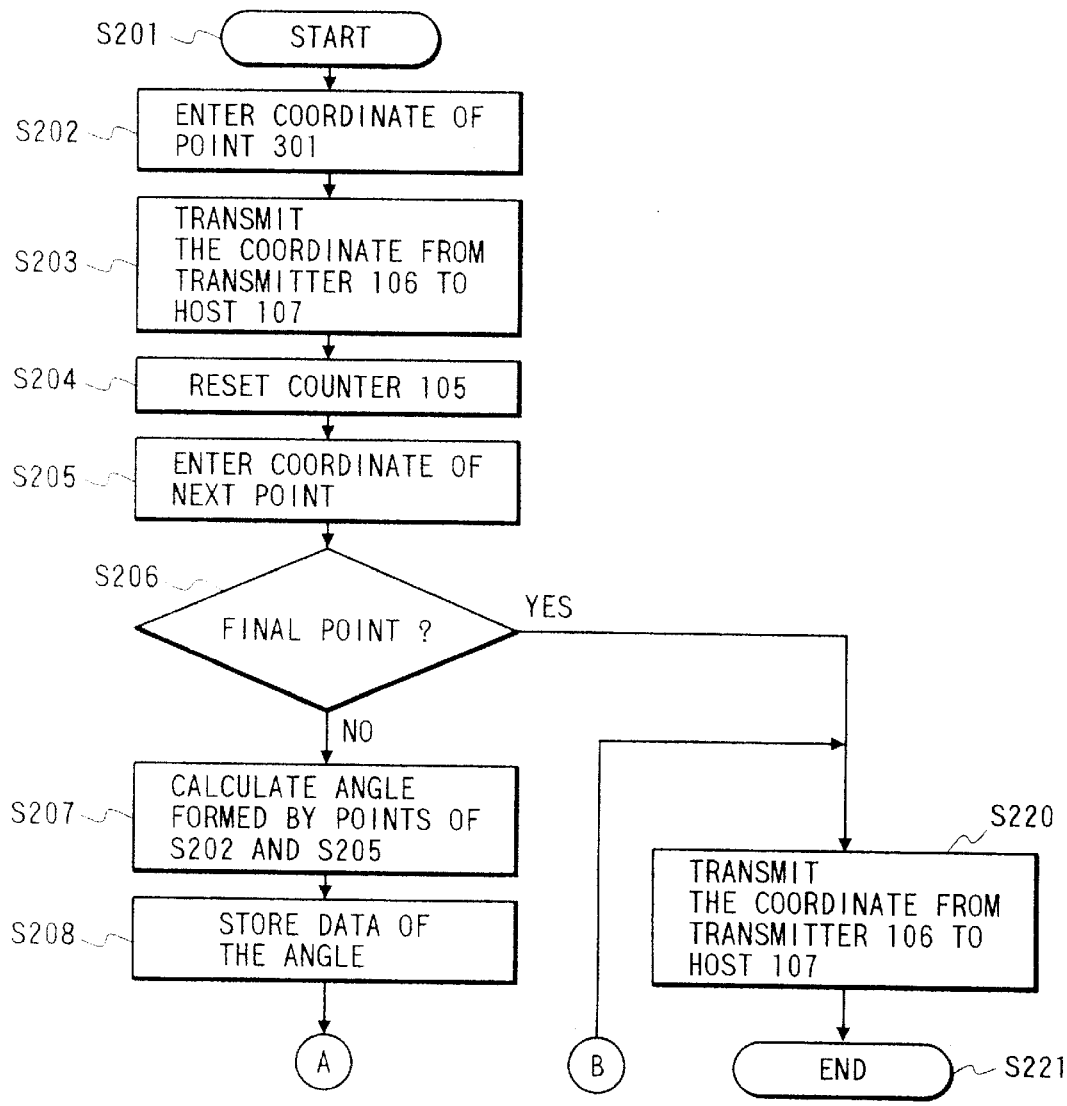

COORDINATE INPUT DEVICE AND METHOD HAVING FIRST AND SECOND SAMPLING DEVICES WHICH SAMPLE INPUT DATA AT STAGGERED INTERVALS

BACKGROUND OF THE INVENTION

1. Field of the Invention

This invention relates to coordinate input device and method for generating data based on coordinate positions specified by an operator.

2. Related Background Art

There are known in the art digitizers which are used as sampling devices. One such device permits handwriting input by the operator using an input appliance such as a stylus pen. The device of this type provides handwriting computing applications, differently from that using a keyboard, by displaying an input trace to a host computer based on coordinate data from the coordinate input device, or by recognizing strings of input coordinate points as a character.

The coordinate input device referred to herein is configured to transmit, to the host computer, an X-Y coordinate pair indicative of a position of the stylus pen, the X-Y coordinate system using a certain point in the input area of the device as the origin, every predetermined time or when a change in the input point becomes large, i.e., when it exceeded a predetermined amount, or in response to a command from the host computer.

On receipt of the coordinates, the host computer displays a string of input points by connecting them by a straight line or interpolating curve such as a spline curve or Bezier curve. This provides the operator with a feeling as if he or she wrote the curve with a pen on paper.

Although some conventional devices may output information indicative of pen pressure, information output from typical coordinate input devices generally only contain coordinates indicative of the input position. In such conventional devices, only the coordinate points to be passed are shown and theoretically the passing direction at each point is present inexhaustibly. Since the coordinate information is usually given in the form of a string of points, the host apparatus connects the input coordinate points by a straight line or interpolating curve to display the input trace.

When connecting two points in the string of input points by a straight line, the processing to display the trace is facilitated, but in many cases the trace does not correspond to an actual input trace. It is therefore desirable to increase sampling points so that the difference between the displayed trace and the actual input trace can be reduced in such a manner. Increase of the sampling points causes an increased work load on the host apparatus as well as an increase in storage capacity of a memory, resulting in inefficient operation.

Alternatively, curve interpolation may be used so as not to increase the storage capacity. One common curve interpolation uses a three-dimensional spline curve.

In the curve interpolation using the three-dimensional spline curve, where the coordinates given at a sampling rate of 100 points/sec. are Pk and Pk+1 respectively, each distance between two coordinate points is made approximate and each approximate curve is computed by calculating the vector. Since the calculation of the vector involves matrix calculation, the processing will take a very long time. This also causes an increased work load on the host apparatus, resulting in inefficient operation as well as reduction in real-time operativity.

In consideration of the above problems, an object of the present invention is to provide a coordinate input device and method capable of interpolating sampling data more faithful to input data with less input data and simper computing.

Another object of the present invention is to provide coordinate input device and method capable of obtaining a trace more faithful to an input trace with less coordinate information and simpler computing.

Still another object of the present invention is to provide coordinate input device and method capable of adding information indicative of a direction of an input trace at each coordinate point of sampling data.

The conventional coordinate input device and the host apparatus have been configured to exchange information therebetween such that the coordinate input device transmits, to the host apparatus, all kinds of information mainly containing coordinate information given at a predetermined, constant sampling rate, while the host apparatus uses the transmitted coordinate information for execution of all kinds of processing such as curve interpolation, information transmission, enlarged/reduced display, information storage and graph/character recognition.

In such an exchange configuration, however, since the coordinate information transmitted from the coordinate input device to the host apparatus is specified on an input surface of the coordinate input device and continuously sent at each predetermined, constant rate, e.g., at a rate of 100 points/sec., its quantity or quality may be unsuitable for some information processing.

For example, in the coordinate input device as configured such above, although the use of a pen appliance for input of handwritten trace information is a common operation, the use of the coordinate information from the coordinate input device to carry out a normal enlarged display processing onto a large-scale display screen consisting of small pixels may produce a trace of the coordinate strings connected by polygonal lines, as shown in FIG. 19, different from the original input curves, even if a user input a Japanese character "/あ", pronounced "a", with smooth curves using the pen appliance as shown in FIG. 18.

The host apparatus may execute a curve interpolation processing based on the coordinate information to overcome the above problem. In this case, apparently displayed characters can be reproduced on the display screen, but other problems arise that processing time for the curve interpolation takes much longer and real-time operativity until displayed after input is impaired.

Further, if it is desired to store or transmit the coordinate information from the coordinate input device, a compression technique and communication protocol may be used together depending on final storage. In this case, the host apparatus is required to temporarily store all the coordinate information from the coordinate input device without fail, therefore, still another problem arises that a trace required for a long input time involves an increasing quantity of information. Likewise, this problem occurs when the host apparatus transfers information to an external device.

Furthermore, the use of all the coordinate information to execute character or graph recognition in the same manner as aforementioned may be extremely wasteful in a case requiring high-speed operation at the beginning of the recognition processing step such as stroke matching or matching between initial and terminal points. It is therefore desirable to normalize the information size or thin out the coordinate information. In contrast, the coordinate information is too small to execute a final recognition processing step at which further detailed recognition should be done such as similar-character discrimination. Thus, yet another problem arises that the coordinate information is either insufficient or wasteful for each individual step in one processing.

The present invention is also solves the above problems by using a coordinate input device capable of outputting coordinate information from the input coordinate input device to a host apparatus with less information content but as effective coordinate information.

The conventional input device such as a digitizer is mainly used to input, to the host apparatus, coordinate data corresponding to each coordinate position specified on a coordinate input surface. The host apparatus converts the coordinate data to each arithmetic expression representative of a curve so that a graph or graphic character can be plotted or created. The created graphic data is then stored or displayed. In other words, the coordinate input device outputs the coordinate data to a CPU of the host apparatus at a fixed time interval, while the CPU converts the coordinate data into a curve using a Bezier curve technique or B-spline function for displaying or storing the curve.

In such a case, since the coordinate data is transmitted from the coordinate input device to the host apparatus at a fixed time interval, a delay is produced in the coordinate data read-in process when the processing steps at the host apparatus are complicated. It is therefore required that the host apparatus sequentially inputs and stores the coordinate data to display the coordinate data input at a fixed time interval by connecting them with a straight line and to display a curve by converting the coordinate data using the Bezier curve technique or the like.

Such a double display configuration, however, may provide a sense of incongruity to the operator due to a difference between two displayed traces. Further, the host apparatus can not read all the coordinate data input at a short time interval while displaying the curve unless the processing speed of the CPU in the host apparatus is extremely high. For this reason, some of coordinate data may be missing within the traced curve when the coordinate data are sequentially input at a high speed and at a short time interval. In this case, although the time interval at which the coordinate data are sequentially input may be extended to avoid the missing coordinate data, this causes a failure in tracing a curve faithful to the graph or character originally drawn or written by the operator.

The present invention is also made in view of the above further problems and yet another object thereof to provide coordinate input device and method capable of generating data for curve approximation based on coordinates specified by an operator.

SUMMARY OF THE INVENTION

One form of the present invention provides a coordinate input device comprising first sampling means for sampling input data with a predetermined sampling cycle; second sampling means for sampling the input data at least at one moment staggered by a predetermined period from the time when the first sampling means sampled the input data; and output means for supplying output data based on sampling data from the first and second sampling means.

BRIEF DESCRIPTION OF THE DRAWINGS

By way of example and to make the description more clear, reference is made to the accompanying drawings in which.

DETAILED DESCRIPTION OF THE PREFERRED EMBODIMENTS (First Embodiment)

According to a first preferred embodiment of the present invention, a coordinate input device includes curve calculation means which starts calculating an approximate curve based on at least four points of coordinate data at the time when the four points of coordinate data have been generated.

The coordinate input device according to the embodiment also includes determination means for determining whether an angle difference between two straight lines is a predetermined value or more, in which one line is formed by a terminal point of the approximate and the previous point and the other line is formed by the terminal point and the subsequent point. If the angle difference is determined to be the predetermined value or more, the terminal point of the approximate curve will be changed to the previous one.

In the embodiment, the approximate curve may be selected among a Bezier curve, a three-dimensional spline curve and a B-spline curve.

Further, the coordinate input device according to the embodiment is configured to output information indicative of the number of coordinate data contained in the approximate curve as well as characteristics of the approximate curve.

Referring to the accompanying drawings, the first embodiment of the present invention will be described below in detail.

Figure 1:
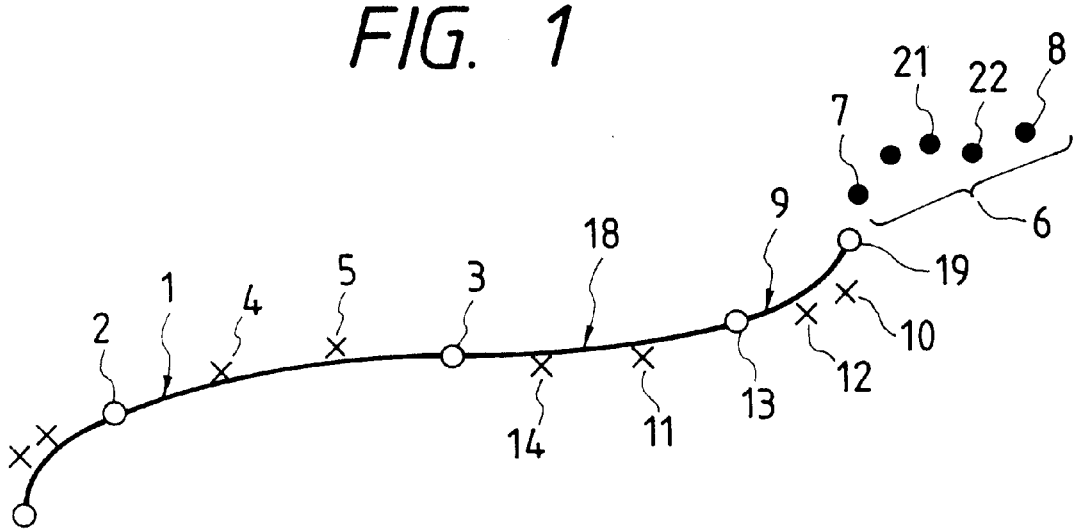
FIG. 1 is an illustration showing a relationship between a Bezier curve and points corresponding to respective coordinate data in a first embodiment of the present invention.

FIG. 1 is an illustration showing a relationship between coordinate data specified by an operator and a Bezier curve in the first embodiment.

In FIG. 1, a Bezier curve section 1 is formed by an initial point 2 and a terminal point 3, including apexes 4, 5. Sections 18, 9 are also Bezier curves previously created. A section 6 indicates a group of multiple points (containing points 7, 8, 21 and 22) corresponding to coordinate data which has not been plotted yet. In such an arrangement, the point 7 corresponds to the first coordinate data (which has been first input) in the section 6, while the point 8 corresponds to the last coordinate data (which has been finally or lastly input). The section 9 is the newest Bezier curve section formed by a point 13 and a point 19. In addition, the Bezier curve section 18 has apexes 14, 11 and the Bezier curve section 9 has apexes 10, 12.

In the case shown in FIG. 1, a certain amount of input coordinate data is converted into a Bezier curve in order of input.

The Bezier curve is typically determined and calculated from four points, namely, the initial point, terminal point and two apexes. In calculating the last Bezier curve 9 of FIG. 1, the next point 7 is also used to obtain a tangent vector. After calculating the Bezier curve 9, all the coordinate data in the section 6 but one at the point 8, i.e., the coordinate data at four points are converted into a Bezier curve. At this time, the coordinate data at the point 8 and the apex 10 are also used to obtain a tangent vector for computing the Bezier curve. Such calculation is started only when determination has been made that the coordinate data at the point 8 could not be part of the Bezier curve.

Figure 2:
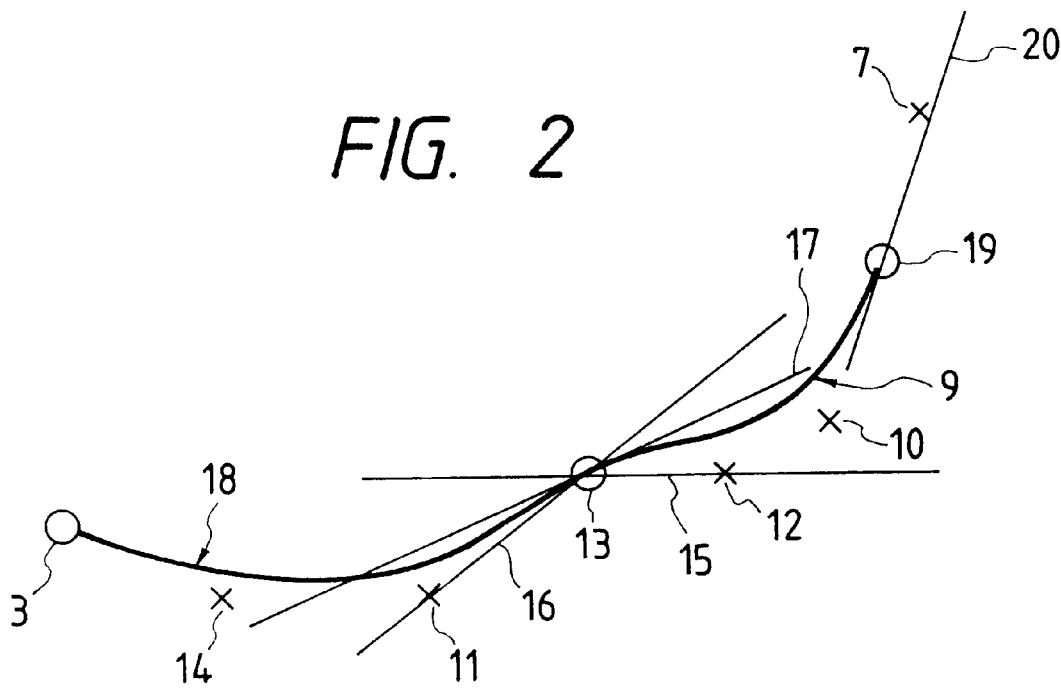
FIG. 2 is an illustration for explaining how to create the Bezier curve in the first embodiment of the present invention.

Referring next to FIG. 2, a description will be made to an operational procedure for converting the coordinate data into a Bezier curve shown in FIG. 1. With the Bezier curve 9, the input of coordinate data is started from the initial point 13, and subsequently the apexes 12, 10 and the points 19, 7 are input in this order. After that, the Bezier curve 9 to be displayed are calculated from the four points 13, 12, 10 and 19. At this time, the Bezier curve 9 needs to be matched with the Bezier curve 18 for showing how to connect these curves. For this reason, the Bezier curve 9 is traced to be tangent to a straight line 17 at the point 13. The straight line 17 is a bisector which equally divides an angle between a straight line 16 connecting points 11, 13 and a straight line 15 connecting points 12, 13.

The Bezier curve 9 also needs to be matched at point 19 with the subsequent Bezier curve being next generated. In other words, the Bezier curve 9 is traced to be tangent to a bisector 20 which equally divides an angle between straight lines, one connecting points 10, 19 and the other connecting points 7, 19.

As such above, the Bezier curve 9 is traced to be tangent to the straight line 17 at point 13 and to the straight line 20 at point 19, including apexes 12, 10.

Figure 3:
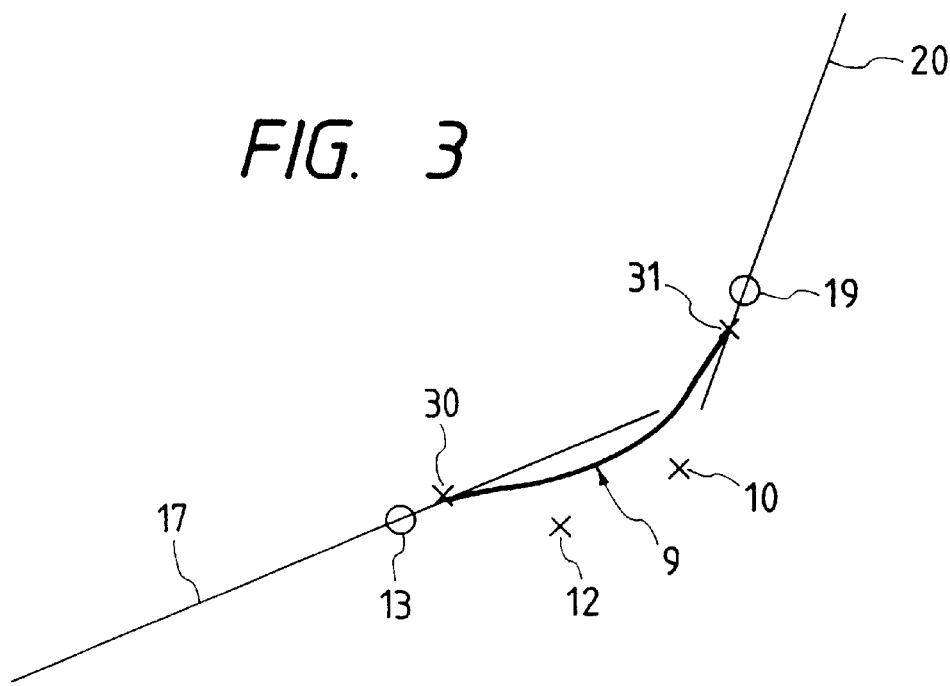
FIG. 3 is an illustration for explaining how to create the Bezier curve in the first embodiment of the present invention.

Next, a technique for tracing the Bezier curve 9 will be described with reference to FIG. 3. In general, a Bezier curve BZ(t) determined by control points P0, P1, ..., Pn is represented by the following equation:

$$BZ(t) = \sum_{i=0}^{n} nCi t^i (1-t)^{n-i} P_i \qquad (1)$$

where t is a parameter changeable from 0 to 1 (i.e, 0<t<1).

Plotting of the Bezier curve 9 is required not only to pass through the four control points 13, 12, 10 and 19, but also to be tangent to the straight lines 17, 19, as discussed above. To meet such requirements, the embodiment adds control points 30, 31 into positions on the tangent lines 17, 19 and nearby the control points 13, 19, respectively. The Bezier curve 9 is thus plotted upon the control points 13, 30, 12, 10, 31 and 19. By adding these control points, such requirements as to contact the Bezier curve 9 with the straight lines 17, 20 can be satisfied. The technique for tracing the Bezier curve 9 of FIG. 3 is taken by way of example to describe the present invention, and any other techniques may be used as long as they satisfy tangential conditions.

Figure 4:
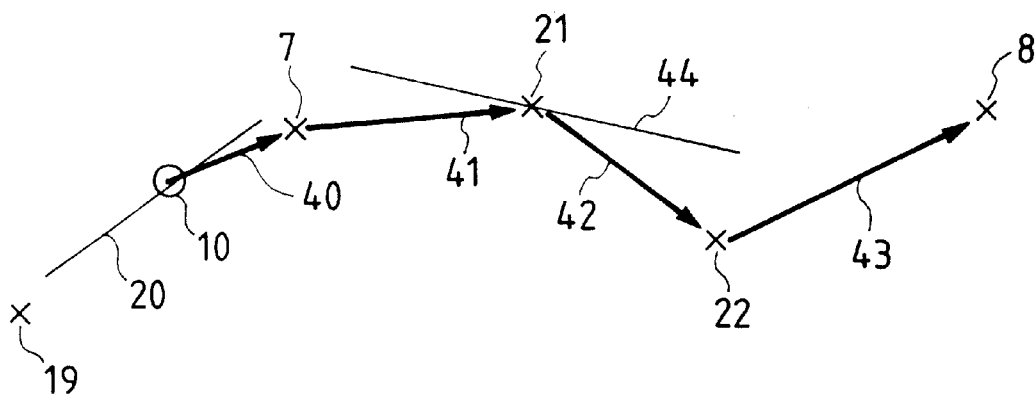
FIG. 4 is an illustration for explaining how to create the Bezier curve in the first embodiment of the present invention.

FIG. 4 is an illustration for explaining how to trace a Bezier curve 41 subsequent to the Bezier curve 9, in which portions common to the aforementioned drawings are given the same reference numerals.

In FIG. 4, there are shown a vector 40 connecting points 10, 7, a vector 41 connecting points 7, 21, a vector 42 connecting points 21, 22, and a vector 43 connecting points 22, 8.

In this case, it is also desirable to trace a new Bezier curve in the same manner as the Bezier curve 9 is traced, i.e., to plot a Bezier curve using points 19, 22, 7 and 21 as the initial point, the terminal point and the apexes, respectively. However, a smooth connection between two Bezier curves to be connected at point 22 can not be obtained since a significantly large change in direction occurs between the vectors 42, 43 to form a sharp angle at point 22. To prevent an unsuitable or imprecise Bezier curve from being traced, it is required to change the number of control points in the above arrangement in a manner described below.

An angle between the vectors 40, 41 is calculated respectively from tan-1 (x, y) to obtain a difference which represents an angle of the vector 41 from the vector 40. As a result of calculation, for example, the angle difference of the vector 41 from the vector 40 is "=0.7" in the radian system (where + indicates the clockwise direction and − is the anticlockwise direction). Likewise, the vector 42 is "−0.6" and the vector 43 is "+0.5".

After obtaining respective angle differences, an absolute value $|D_{angle}|$ of a difference between two angle differences is then calculated. Specifically, an absolute value $|D_{angle}|$ of a difference between two angle differences "−0.7" and "−0.6" is "0.1", while an absolute value $|D_{angle}|$ of a difference between "−0.6" and "+0.5" is "1.1".

These absolute values are compared with a threshold value Th, respectively. The threshold value is used to change the number of coordinate point groups to be converted into a Bezier curve. If the threshold value is "0.6", the absolute value remains within the threshold value Th until the vector 42 (0.1<0.6), but it exceeds the threshold value Th at the time when the vector 43 appears (1.1>0.6).

It will be understood that an appropriate Bezier curve can be traced across sections from the initial point 19 to the coordinate point 22, i.e., until the vector 42, but not in the next section since the direction of the vector 43 is remarkably changed. To provide a continuous connection between the Bezier curve section of the vector 42 and next one (to be started from the coordinate point 22), it is convenient to start the next Bezier curve section from the point 21 previous to the point 22.

Thus, a tangent 44 is obtained from two straight lines containing the vectors 41, 42 on both sides of the point 21 by calculating a bisector equally dividing an angle between the two straight lines.

Figure 5:
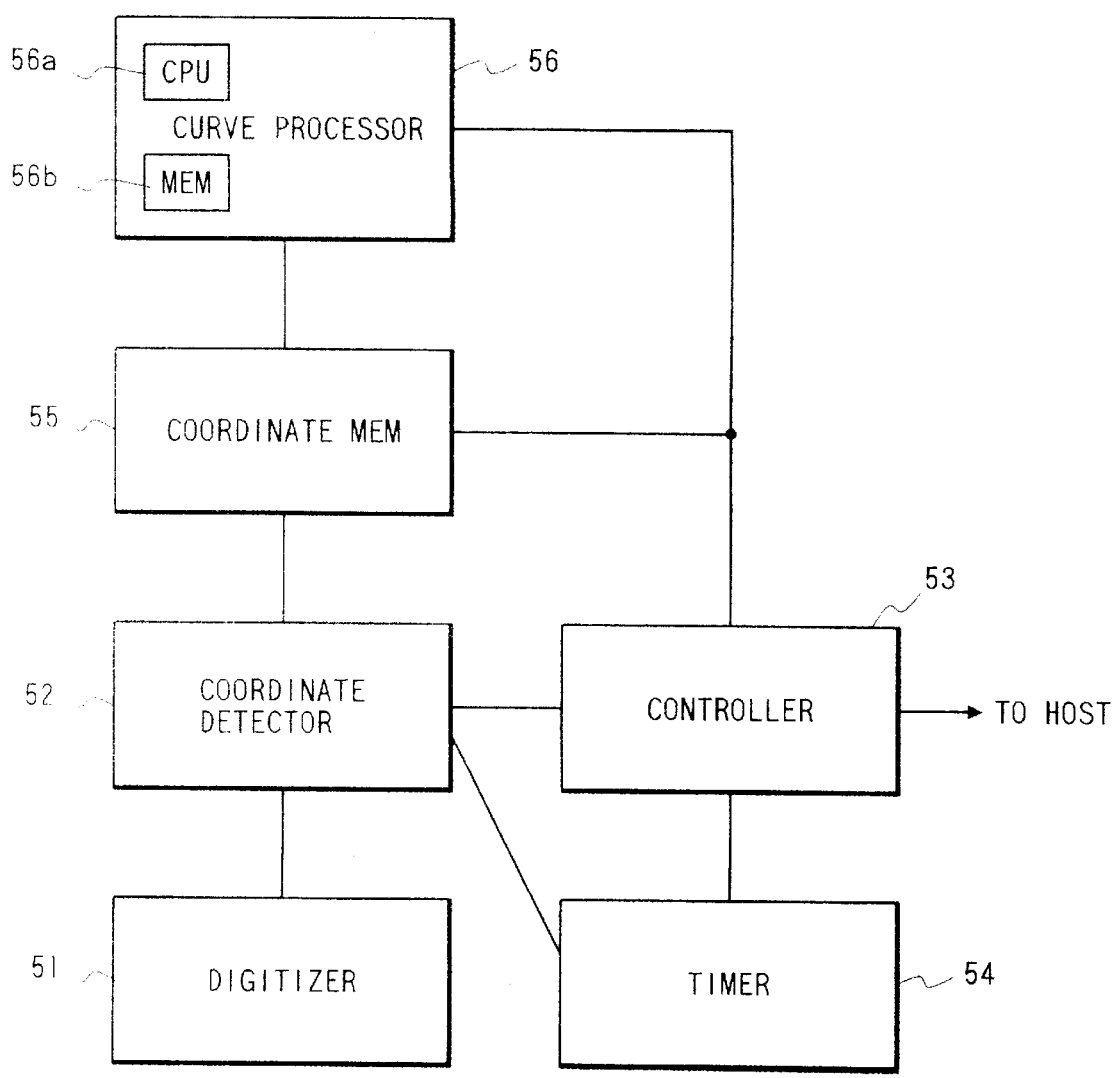
FIG. 5 is a block diagram showing a structure of a coordinate input device according to the first embodiment of the present invention.

FIG. 5 is a block diagram showing the main part of a coordinate input device according to the embodiment.

In FIG. 5, a digitizer 51 includes a coordinate input surface on which an operator specifies coordinates of data using an input appliance such as pen. A coordinate detector 52 detects coordinate positions specified by the operator to the digitizer 51. A controller 53 controls operation of the other blocks, and transmits, to a host computer, coordinate data, base point/apex coordinate data indicative of a Bezier curve created upon the coordinate data and such. A timer 54 measures predetermined time in accordance with instructions from the controller 53. A coordinate memory 55 stores the coordinate data detected by the coordinate detector 52 and input thereto. A curve processor 56 produces trigonometric functions based on the coordinate data stored in the coordinate memory 55, or approximate curve data based on coordinate data obtained from angle calculation.

In operation, the coordinate detector 52 actuates the digitizer 51 to generate coordinate data of a point at which the pen is in contact with the coordinate input surface of the digitizer 51. The generated coordinate data is output to the coordinate memory 55 and stored therein. On the other hand, the controller 53 counts the number of coordinate data to be processed, in response to interrupt pulse signals, and when four or more unprocessed coordinate data have been counted, it actuates the curve processor 56 to start processing apexes. The controller 53 then transmits to the host computer curve information containing the coordinate data of base points and apexes derived by the curve processor 56. The coordinate data of the base points and apexes each include a flag indicative of a particular point at which the coordinate data exists. At this time, information concerning the number of coordinate data originally contained within a Bezier curve (i.e., information indicative of time) is also transmitted to the host computer together with the curve information.

Figure 6:
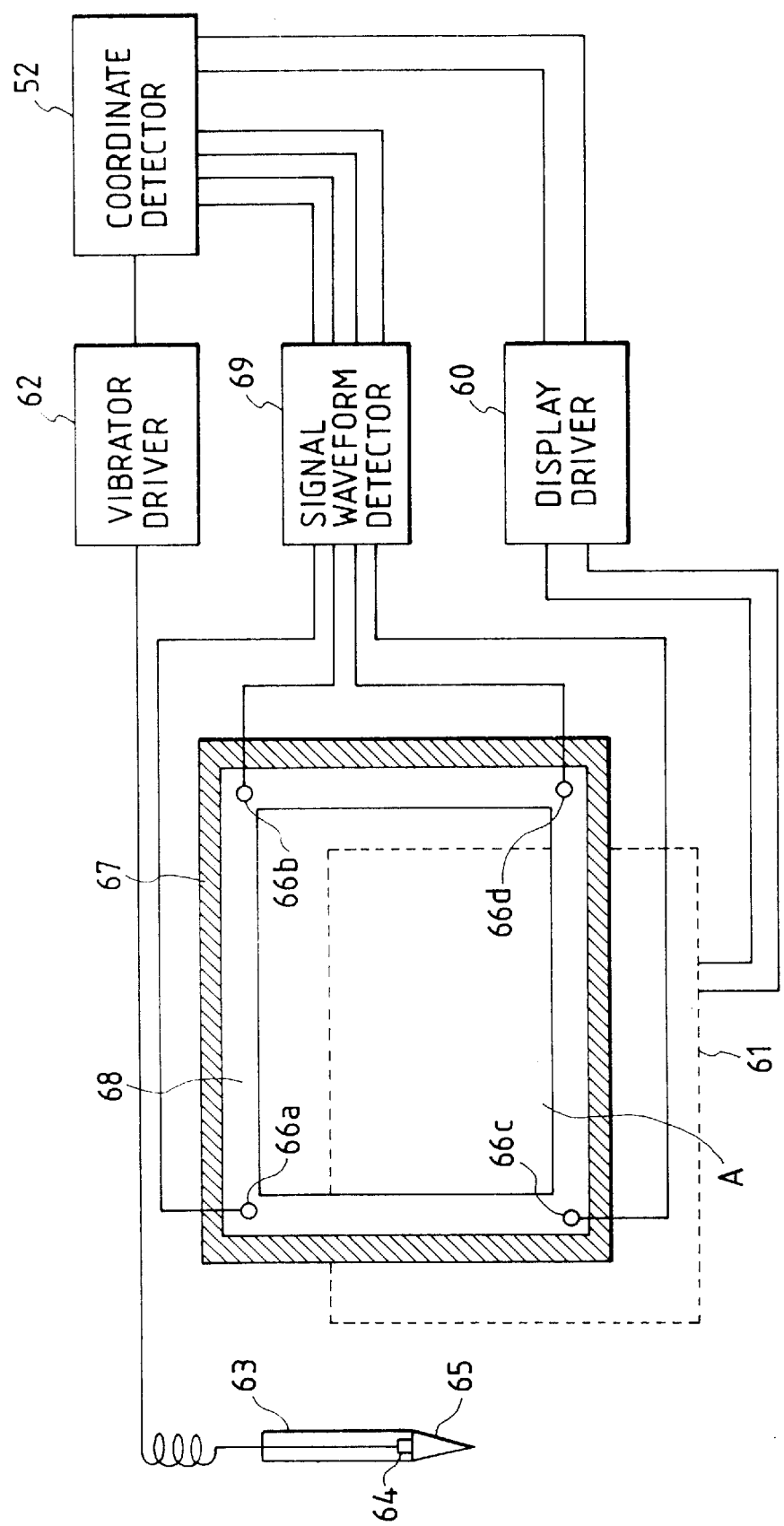
FIG. 6 is an exemplary digitizer according to the first embodiment of the present invention.

FIG. 6 shows a coordinate input system utilizing an ultrasonic digitizer which is taken by way of example to briefly describe operation for detecting coordinate positions specified to the digitizer 51.

The working principle of such an ultrasonic digitizer is disclosed, for example, in JP-B-5-62771 and therefore needs not be discussed in detail.

In FIG. 6, when a vibrator-type or vibratory input pen 63 is in contact with a surface of a vibration transmitting material 68, if a driving signal is sent thereto from the coordinate detector 52 through a vibrator driver 62, then the vibratory input pen 63 starts vibrating so that the vibration will be transmitted to the vibration transmitting material 68. The vibration spreads into the material 68 at an inherent propagation rate and is detected by sensors 66a to 66d provided at four corners. Since the coordinate detector 52 measures the time after the driving signal was output until it reaches the vibratory input pen 63, each distance between the vibratory input pen 63 and the respective sensors 66a to 66d can be calculated from the measured time and the propagation velocity previously measured. In the above reference, JP-B-5-62771, among several propagation time applications, a propagation delay time is used for calculating the distance, which is determined by group velocity and phase velocity. The calculated distance between the vibratory input pen 63 and each sensor 66a–66d can be used to produce data indicative of the present coordinate position specified by the pen 63 based on the Pythagorean proposition.

Figure 7:
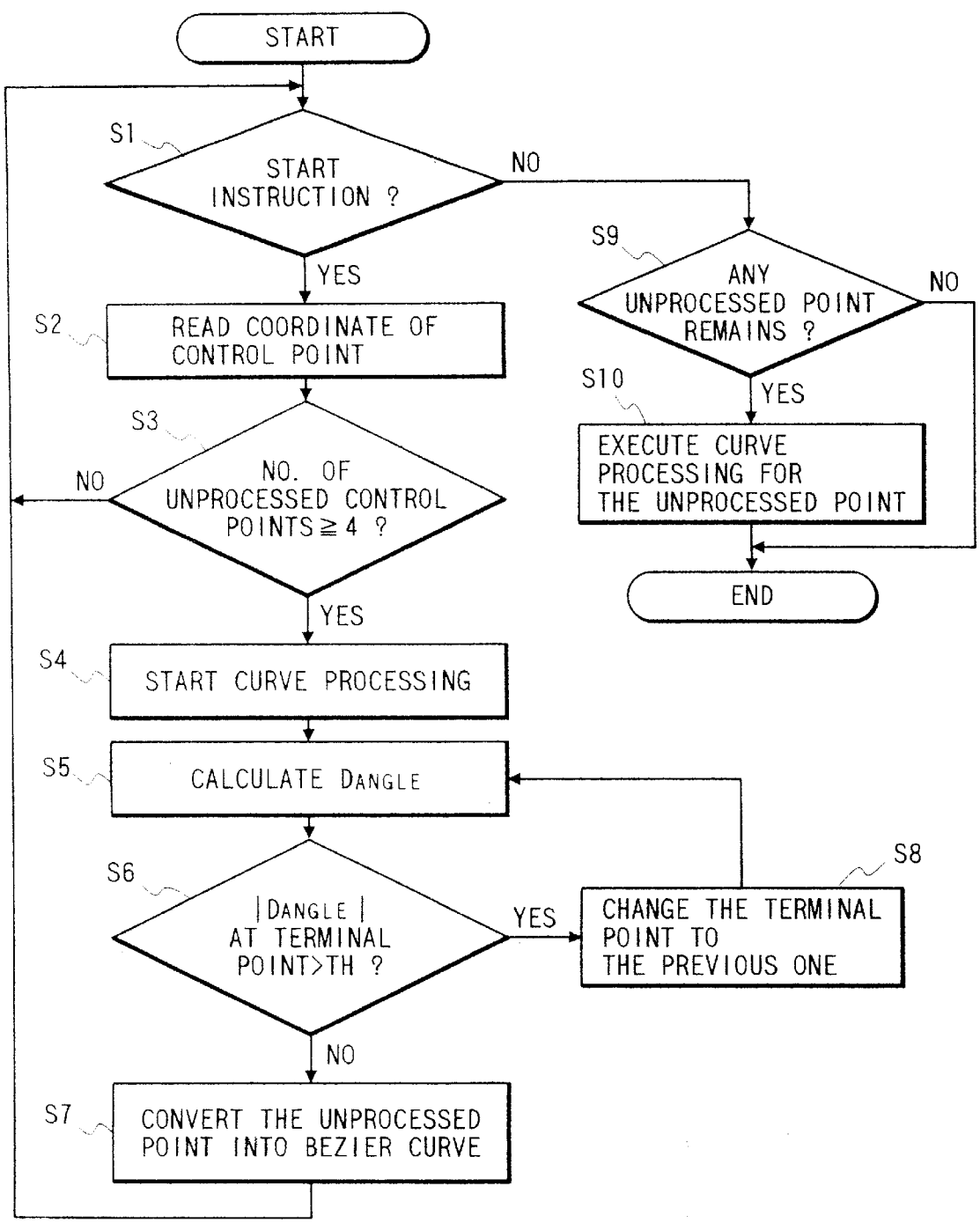
FIG. 7 is a flowchart showing operation for creating the Bezier curve in the coordinate input device according to the first embodiment of the present invention.

Referring now to the flowchart of FIG. 7, operation of the curve processor 56 will be described upon the above discussion. The operation of the curve processor 56 is carried out under control of a CPU 56a by a control program stored in a memory 56b, the CPU 56 and the memory 56b both incorporated in the curve processor 56.

At first, determination is made at step S1 as to whether the controller 53 instructed the curve processor 56 to start the curve processing. If it has been instructed, the operational procedure goes to step S2, and the curve processor 56 starts reading coordinates of control points input from the digitizer 51 and stored in the coordinate memory 55 in response to signals sequentially output from the controller 53 at timing from the timer 54. The number of unprocessed control points is then counted at the subsequent step S3. If the number is less than four, the operational procedure returns to step S1 and repeats the above processing steps.

If the number is four or more, it shifts from step S3 to step S4, and the curve processor 56 starts processing apexes of a Bezier curve. The processing is started at step S5 from calculation of a difference $D_{angle}$ between two angle differences, each between two vectors on both sides of a terminal point, as discussed above. If the absolute value $|D_{angle}|$ exceeds the threshold value Th (step S6), the terminal point of the Bezier curve is changed to the previous one. After that, the operational procedure returns to step S5.

On the other hand, if the curve processor 56 has not been instructed to start reading the control points at step S1, the operational procedure goes to step S9, and it is checked whether there remains any unprocessed point which has been input until then. If not remain, the curve processor 56 stops the curve processing. If remains, it goes to step S10, and the curve processing is executed for the unprocessed point or points before the curve processor 56 stops the curve processing.

(Second Embodiment)

Next, a description will be made to a second embodiment in which coordinate output prior to execution of the curve processing are combined with continuous curve output in the first embodiment.

Figure 8:
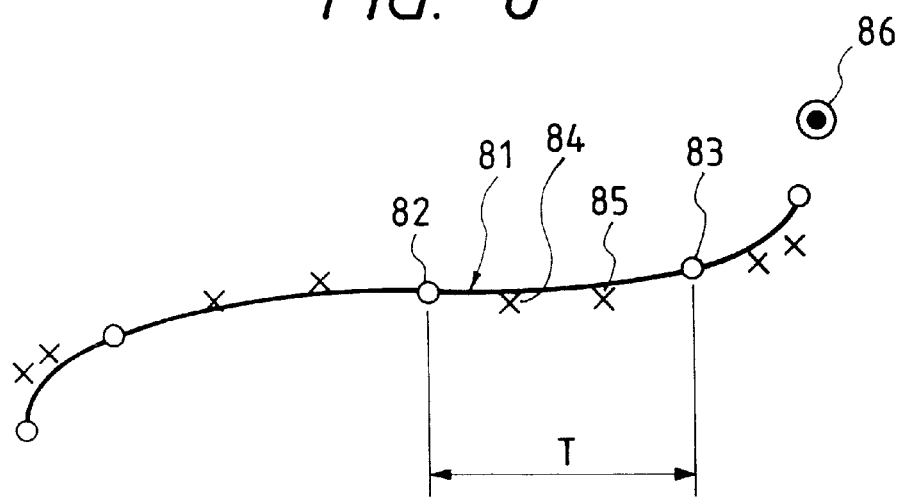
FIG. 8 is an illustration showing a relationship between a Bezier curve and points corresponding to respective coordinate data in a second embodiment of the present invention.

FIG. 8 is an illustration showing a relationship between a Bezier curve and points corresponding to respective coordinate data in the second embodiment of the present invention.

In FIG. 8, a Bezier curve 81 is formed by an initial point 82 and a terminal point 83, including apexes 84, 85. A point 86 is also displayed as coordinate data provisionally output.

In the case shown in FIG. 8, a certain amount of input coordinate data is converted into a Bezier curve in order of input as the coordinate data are output. As described above, the Bezier curve is determined by four points, namely, the initial point, terminal point and two apexes so that display points can be calculated therefrom. Time required for inputting the terminal point after the initial point was input is also output together with data representative of the Bezier curve. After outputting the Bezier curve, among all the coordinate data before converted into the Bezier curve, the last coordinate data (which has been finally or lastly input) is output as a provisional coordinate data. The provisional coordinate data is displayed to point 86. The provisional coordinate data is output at each fixed interval or when the operator specifies a position of coordinate data which is located predetermined distance apart or more from the previous provisional point.

Although each of the above embodiments discussed an ultrasonic digitizer, the present invention is not limited by the embodiments and may be applied to any other digitizers such as resistive film type digitizer and electromagnetic digitizer, or pointing devices such as a mouse.

Each of the embodiments also took a two-dimensional Bezier curve by way of example to describe the present invention, but any other curves may be used instead, such as three-dimensional spline curve, parabolic blending curve and arc.

The present invention may be applied to a system including a plurality of apparatuses, such as host computer, interface and printer, or to a single apparatus. Further, it can be applied to a case in which all features are implemented in the system or apparatus by supplying a program. In this case, the present invention will feature a storage medium for storing the program. The program is read out from the storage medium to the system or apparatus so that the system or apparatus can behave according to the program's law.

According to the embodiments described above, since the coordinate input device produces curve data to be output to the host computer, the work load on the host computer can be reduced.

The amount of communication data between the host computer and the coordinate input device can be also reduced, or an increasing number of sampling coordinate data can be obtained in the coordinate input device, so that the specified coordinate data can be converted into a curve more approximate to an actual or handwritten curve.

Further, the coordinate data can be continuously output to the host computer while displaying points indicative of the coordinate data to a display of the host computer, and this permits pen's path to be displayed before the operator hands up the pen, i.e., before the coordinate specification or input is stopped.

Furthermore, time data may be added to these coordinate data so that the host computer can discriminate a difference in pen pressure, for example, between tap and press.

Furthermore, since the second embodiment is configured to output provisional coordinate data, the curve can be temporarily displayed to a position closer to the coordinate position from which input of the subsequent coordinate data should be started.

As discussed above, according to the above embodiments, approximate curve data can be obtained from the specified coordinates.

The above embodiment also have the advantage of creating a curve more approximate to the specified coordinate data.

(Third Embodiment)

Figure 11:
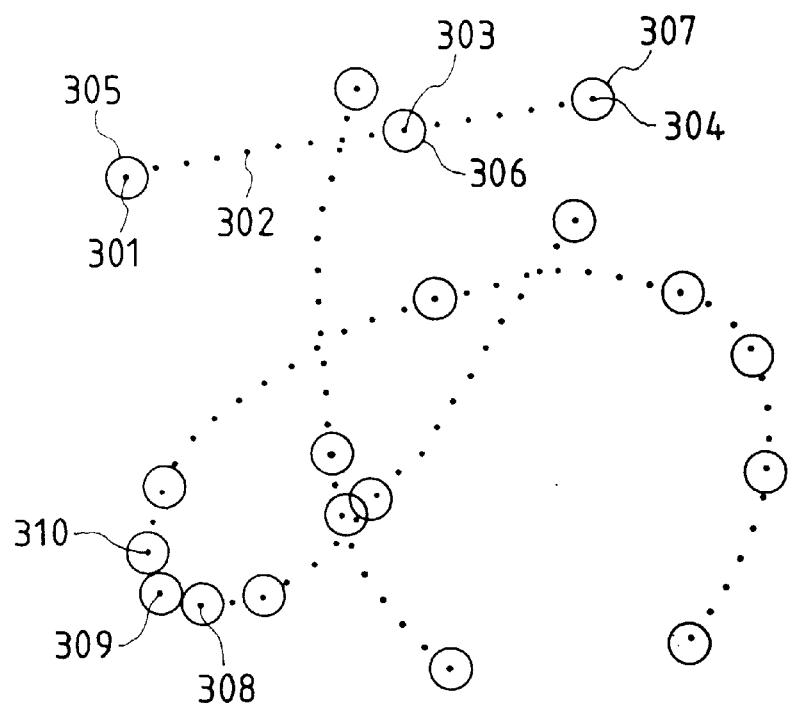
FIG. 11 is an illustration of a coordinate strings sent out from the coordinate input device according to the third embodiment of the present invention.
Figure 9:
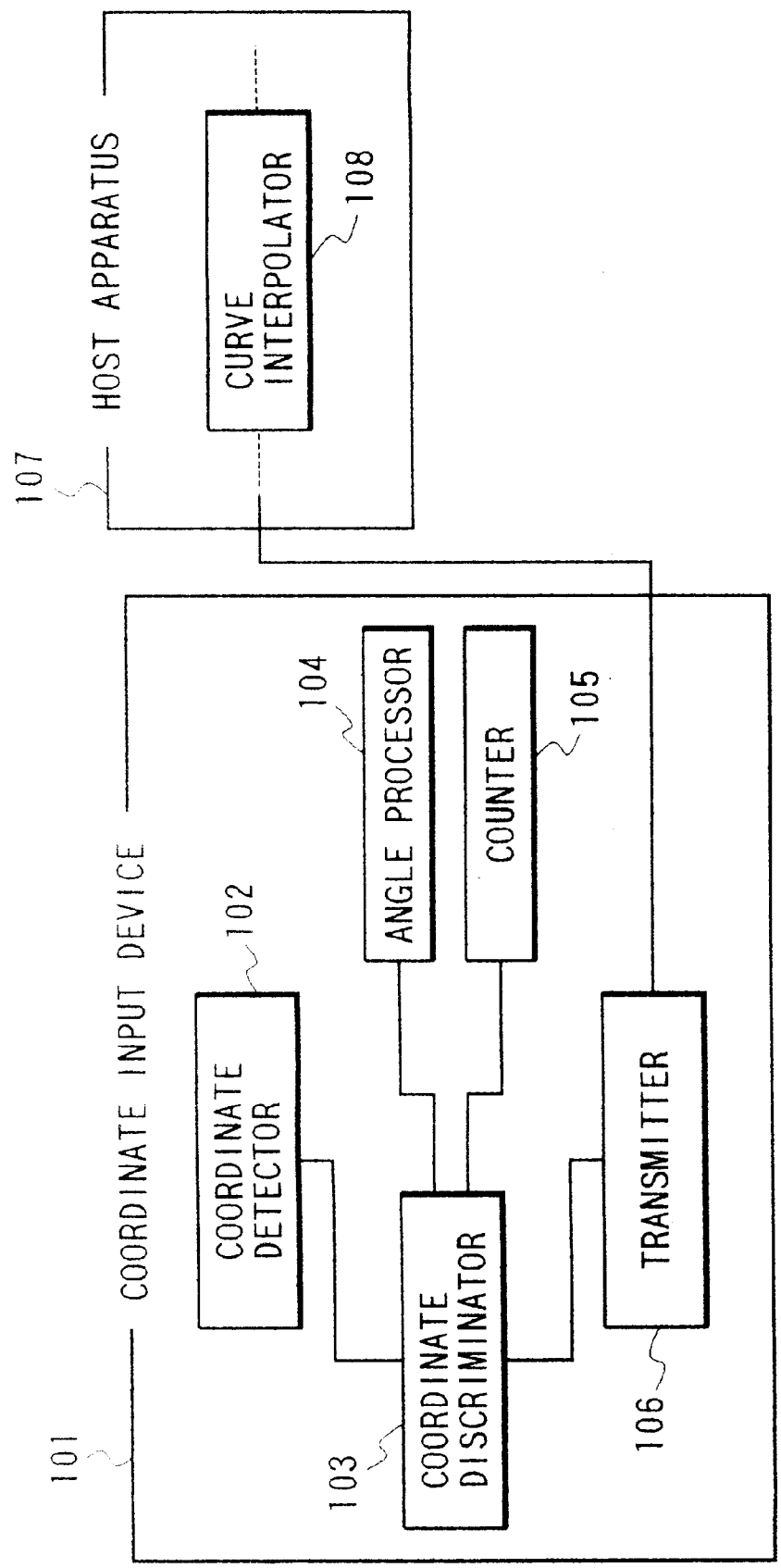
FIG. 9 is a schematic block diagram showing a system structure including a coordinate input device and a host apparatus according to a third embodiment of the present invention.

Referring to FIGS. 9 through 11, a third embodiment of the present invention will be described below.

Figure 10B:
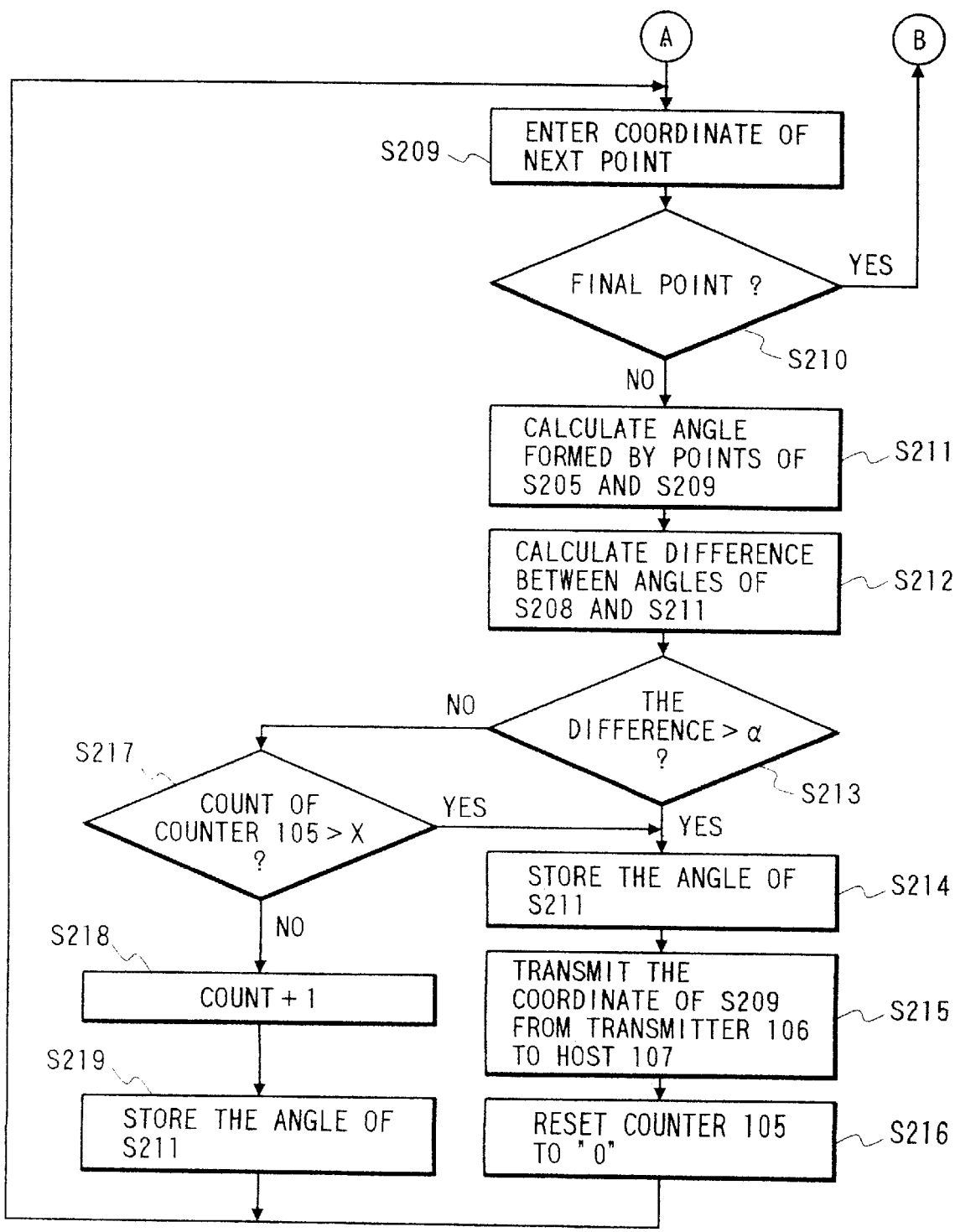
FIG. 10 which is composed of FIGS. 10A and 10B is a flowchart showing operation in the third embodiment of the present invention.

FIG. 9 is a schematic block diagram showing a system structure including a host apparatus and a coordinate input device according to the third embodiment; FIGS. 10A and 10B are flowcharts showing operation in the embodiment; and FIG. 11 is an illustration of coordinate strings which represent output information from the coordinate input device according to the embodiment.

In FIG. 9, the coordinate input device 101 includes a coordinate detector 102 and a coordinate discriminator 103 for determining whether or not the coordinates detected by the coordinate detector 102 should be output. The coordinate detector 102, which may be constituted with one of well-known means, is connected to the input of the coordinate discriminator 103. An angle processor 104 and a counter 105 are also connected to the input of the coordinate discriminator 103. The angle processor 104 calculates an angle between adjacent two coordinate points previously input and detected, stores the angle therein, and compares the stored angle with the next angle at a coordinate point newly detected. The counter 105 counts the number of detected coordinates. The angle processor 104 and the counter 105 thus constitute coordinate calculation and processing means for calculating and processing the coordinate data detected by the coordinate detector 102. On the other hand, a transmitter 106 is connected to the output of the coordinate discriminator 103. The transmitter 106 outputs coordinate information to a host apparatus 107 in accordance with instructions from the coordinate discriminator 103.

The host apparatus 107 executes all kinds of processings utilizing the coordinate information sent out from the coordinate input device 101. The host apparatus 107 includes a curve interpolator 108 for interpolating a curve of the coordinate data from the coordinate input device 101 as required.

The coordinate strings in FIG. 11 consist of coordinates of a handwritten trace which is input with a pen appliance onto an input surface of the coordinate input device. For example, a string of small points typified by 301, 302, 303 and 304 is a coordinate string detected by the coordinate detector 103 of the coordinate input device 101 when one line of the first stroke of a Japanese character "あ" was written with the pen appliance on the input surface of the coordinate input device 101.

Points enclosed with circles and labeled 305, 306 and 307 are coordinates to be output from the coordinate input device 101 to the host apparatus 107. These points are specified by circles each having a fixed radius for convenience sake.

Although only the first stroke of the Japanese character "あ" is described herein, the second and third strokes are also processed in the same manner as the first stroke was processed and therefore need not be discussed here in further detail.

In operation, when the operator starts from point 301 inputting a series of strokes to the coordinate input device 101 with the pen appliance, as shown in FIG. 11, the processing operation of the coordinate input device is started at step S201 in FIG. 10A. Then, coordinates at the initial point 301 of the first stroke are read in the coordinate detector 102 at step S202, and transferred to the transmitter 106 at step S203 for transmission to the host apparatus 107.

At the subsequent step S204, the counter 105 is reset, for example, to "2" as an initial value, which indicates the number of coordinate values read in the coordinate detector 102 before the counter starts counting the first coordinate value. Then, the point subsequent to the initial point 301 of the first stroke is read in the coordinate detector 102 at step S205. At the next step S206, it is determined whether the point read in the coordinate detector 102 at step S205 is the terminal point of the first stroke, and if it is the terminal point, the operational procedure jumps to step S220. At step S220, the read coordinate data at that point is transmitted from the transmitter 106 to the host apparatus 107, and the operation for processing this stroke section is finished at step S221.

However, since the point read herein is not the terminal point of the first stroke, the operational procedure shifts from step S206 to step S207, and calculation is made for an angle formed by two points, one read in at step S202 and the other read in at step S205. The angle calculated at step S207 is temporarily stored at step S208, and coordinate data at the subsequent point is read in at step 209. At the subsequent step S210, as similar to step S206, it is determined whether the coordinate data read in at step S209 is the terminal point of the first stroke. If it is the terminal point, the operational procedure jumps to step S220 in the same manner as step S206. At step S220, the read coordinate data at that point is then transmitted from the transmitter 106 to the host apparatus 107, and the operation for processing this stroke section is finished at step S221.

However, the point read herein is not the terminal point of the first stroke, so that it goes to step S211, and calculation is made for an angle formed by the point read in at step S209 and the previous point read in at step S205. Then, a difference between the angle calculated at step S211 and the angle temporarily stored at step S208 is calculated at step S212. At subsequent step S213, the difference is compared with a predetermined value a, for example, it is compared with an angle "2π/10(rad)" dividing the circle into ten equal parts. If the difference between the angles is larger than the predetermined value a, the operational procedure goes to step S214. If smaller, it branches to step S217.

Since the first stroke started from point 301 of FIG. 11 is substantially equal to the horizontal line, the difference between the angles must be smaller than the angle "2π/10 (rad)" and therefore the operational procedure will branch to step S217. At step S217, the count value of the counter 105, which represents the number of coordinate data being read in the coordinate detector 102 until then, is compared with a predetermined value X, e.g., it is compared with "10". If the value X is larger than the count value of the counter 105, the operational procedure shifts to step S214.

Since the count value of the counter 105 remains reset, i.e., it remains at the initial value "2", the counter 105 counts up by one at step S218 and the angle calculated at step S211 is temporarily stored at step S219. After that, the operational procedure returns to step S209.

Likewise, among all the points constituting the first stroke, a string of points from point 302 through the point previous to point 303 is processed in sequence in the same manner as in the flowcharts of FIGS. 10A and 10B.

Next discussion is held on processing operation after the point 303 was read in the coordinate detector 102 at step S209. Although this case is also processed from steps S209 through S217 in the same manner as discussed above, since the count value of the counter 105 becomes "11" at step S217, i.e., it exceeds "10" of the value X, the procedure goes to step S214.

Then, the angle calculated at step S211 is temporarily stored at step S214, and the coordinate data read in at step S209 is transmitted from the transmitter 106 to the host apparatus 107. At the subsequent step S216, the count indicative of the number of coordinate data is reset to "0", and the operational procedure returns to step S209.

Finally, a description will be made to processing operation when the terminal point 304 of the first stroke in FIG. 11 was read in the coordinate detector 102 at step S209 after processing a stroke section from point 303 through the point previous to point 304. The coordinate data at point 304 is first read in the coordinate detector 102 at step S209. At the subsequent step S210, it is determined from pen-up information or the like as to whether the point 304 is terminal point of the first stroke. In this case, the point 304 is terminal point and therefore the operational procedure jumps to step S220. The coordinate data at point 304 is transmitted from the transmitter 106 to the host computer 107 at step S220, and the processing operation is finished at step S221.

In the case a stroke section to be processed is largely curved, such as a section of the third stroke typified by points labeled 308, 309 and 310 in FIG. 11, since the difference between angles calculated at step S212 is determined at step S213 to be larger than the predetermined value a, the operational procedure goes to step S214, and the coordinate data read in at step S209 is transmitted from the transmitter 106 to the host apparatus 107 at step S215.

As discussed above, any conventional coordinate input device has been required to output all the coordinate data in each stroke, typified by point 302 in FIG. 11. In contrast, the coordinate input device according to the embodiment can thin out coordinate data, i.e., it can extract only coordinate data at points typified by 301 and 303 and enclosed with circles 305 and 306, thus extremely reducing information content to be transmitted to the host apparatus.

Further, the predetermined value X to be compared with the number of continuous points read in the coordinate detector 102, and the predetermined value a to be compared with the difference between variable angles may be changed properly, and this makes it possible to extract point information to be transmitted to the host apparatus as optimum characteristics for execution of all kinds of processings in the host apparatus without a special load on the host apparatus.

(Fourth Embodiment)

Referring to FIGS. 12 through 17, a fourth embodiment of the present invention will be described below.

Figure 12:
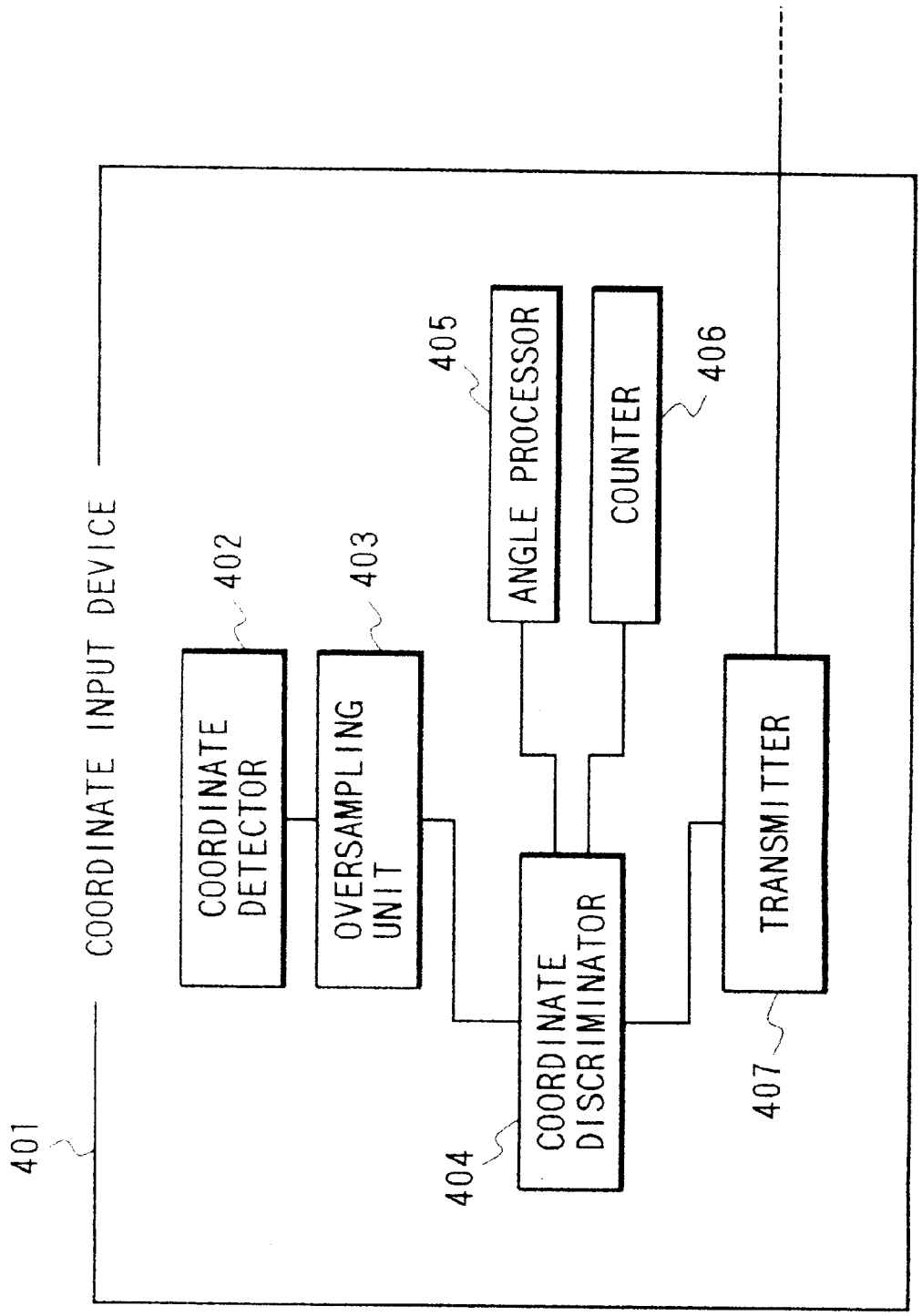
FIG. 12 is a schematic block diagram showing a structure of a coordinate input device according to a fourth embodiment of the present invention.
Figure 13:
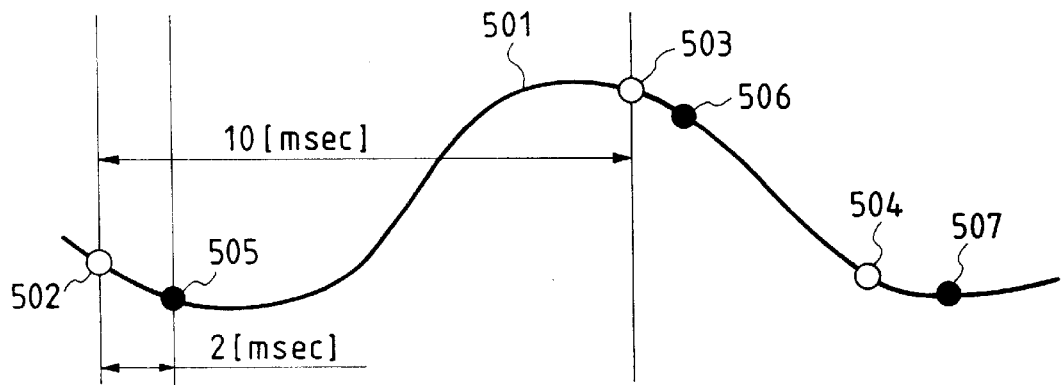
FIG. 13 is an illustration of a written curve for explaining the operation of the coordinate input device according to the fourth embodiment of the present invention.
Figure 14:
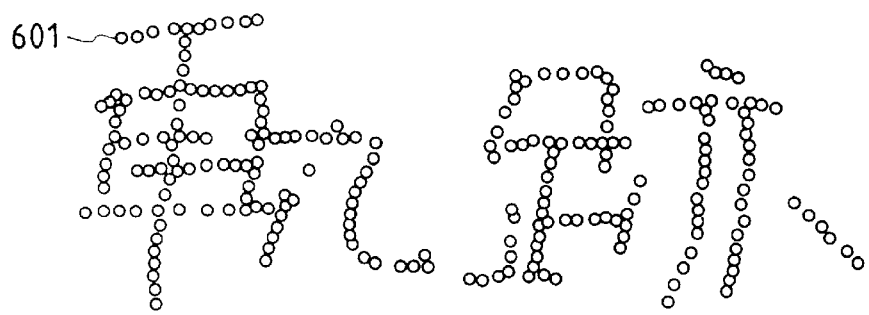
FIG. 14 is an illustration of coordinate strings output from a conventional coordinate input device.
Figure 15:
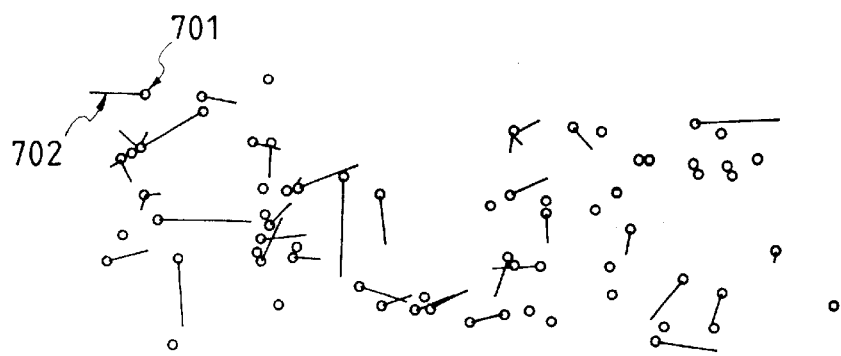
FIG. 15 is an illustration of coordinate strings output from the coordinate input device according to the fourth embodiment of the present invention.
Figure 16:
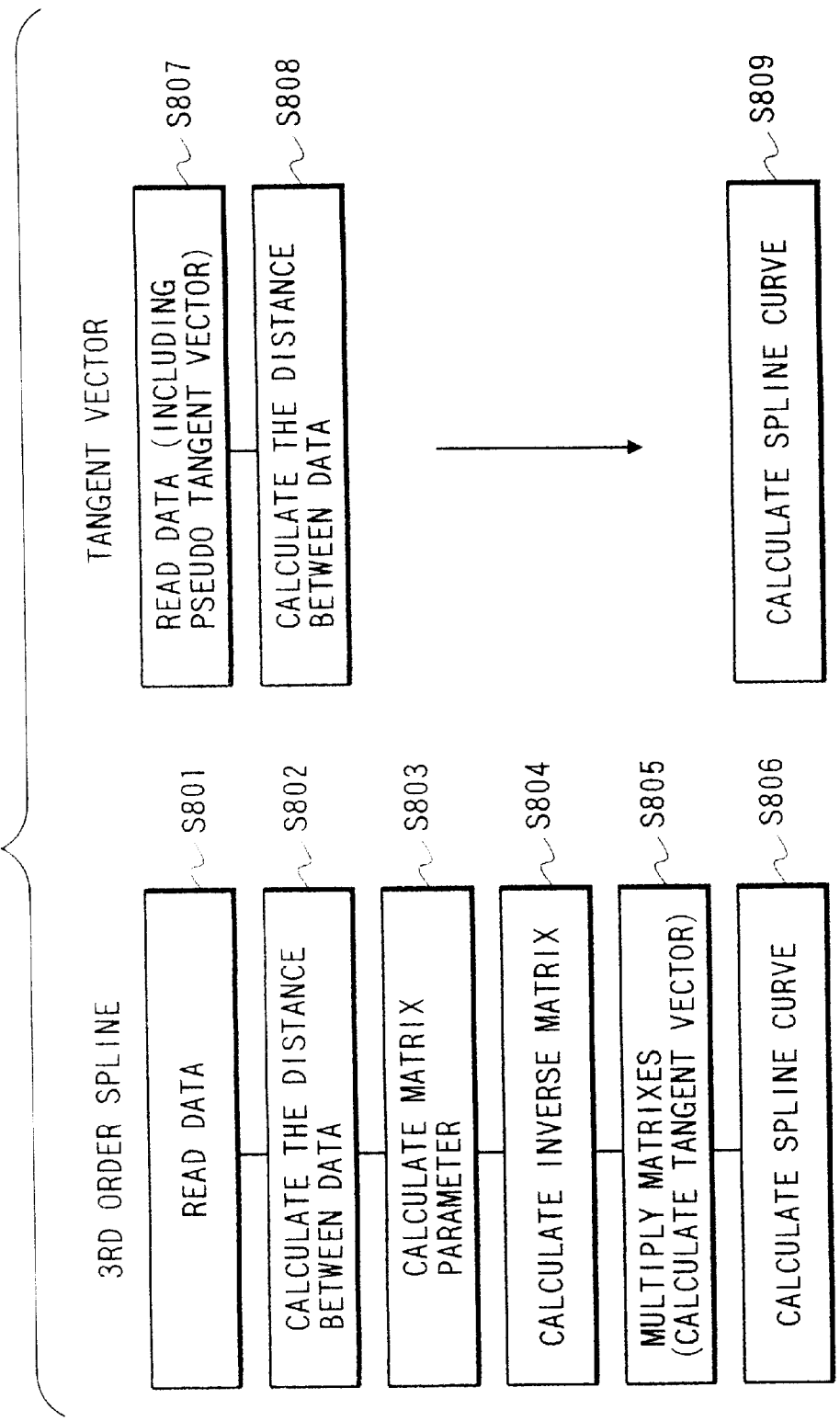
FIG. 16 is a flowchart showing a sequence of operational procedure for executing curve interpolation in the fourth embodiment in comparison with conventional curve interpolation.
Figure 17:
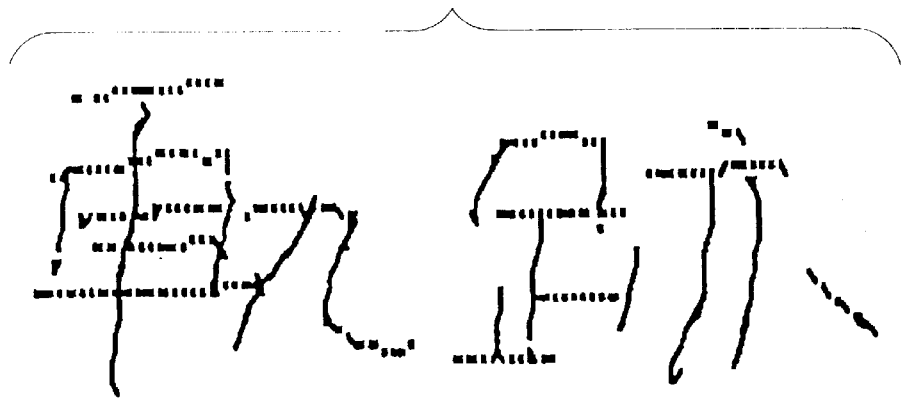
FIG. 17 is an illustration of an exemplary character with interpolated curves which is output from the host apparatus according to the fourth embodiment of the present invention.
Figure 18:
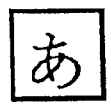
FIG. 18 is an illustration for explaining a conventional coordinate input device.
Figure 19:
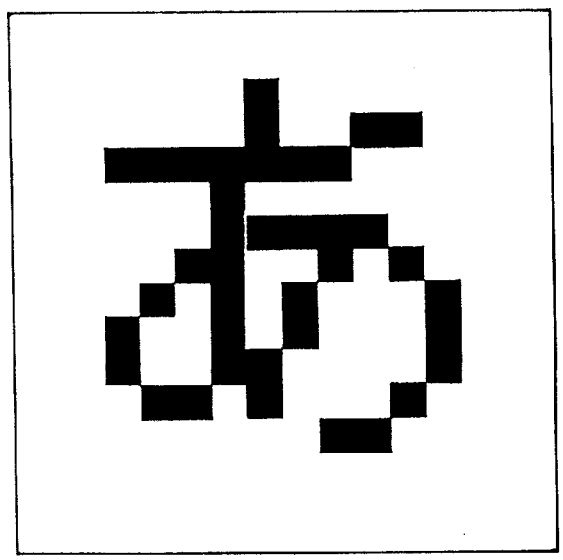
FIG. 19 is an illustration of exemplary display of an enlarged character output from the conventional coordinate input device.

FIG. 12 is a schematic block diagram showing a structure of a coordinate input device according to the fourth embodiment; FIG. 13 is an illustration of a written curve for explaining operation of the coordinate input device according to the embodiment; FIG. 14 is a illustration of coordinate strings output from a conventional coordinate input device; FIG. 15 is a illustration of coordinate strings output from the coordinate input device according to the embodiment; FIG. 16 is a flowchart showing a sequence of operational procedure for execution of curve interpolation in the embodiment in comparison with conventional curve interpolation; and FIG. 17 is an illustration of an exemplary character with interpolated curves which is output from the host apparatus according to the embodiment.

As shown in FIG. 12, the embodiment is different from the third embodiment in that an oversampling unit 403 is added into the coordinate input device 101 of FIG. 8 for detecting coordinate data with an oversampling cycle. In FIG. 12, there are shown a coordinate input device 401, a coordinate detector 402, a coordinate discriminator 404, an angle processor 405, a counter 406, and a transmitter 407. These units have the same functions as the respective corresponding units shown in FIG. 9 and therefore need not be discussed here in further detail.

Referring next to FIG. 13, operation of the coordinate input device 401 according to the embodiment will be described. In FIG. 13, a curve 501 is part of handwritten trace which was input to the coordinate input device 401 using an input appliance such as a pen. Points 502, 503 and 504 are detected points which were read in the coordinate detector 402, for example, every 10 msec., while points 505, 506 and 507 occurs immediately after detection of the corresponding points 502, 503 and 504, which are detected here as coordinate data after 2 msec. In the embodiment, each differential vector formed by each point pair, i.e., by a point pair 502 and 505, 503 and 506, or 504 and 507, is used as a pseudo tangent vector at each point 502, 503 or 504 to be transmitted to the host apparatus by adding it to the coordinate information selected for transmission to the host apparatus in the same manner as in the first embodiment.

FIG. 14 shows coordinate strings which were input with an input appliance such as a pen and read in the coordinate detector of the conventional coordinate input device with a fixed sampling cycle. The coordinate strings represent Chinese characters "軌跡", which means "trace" and is pronounced "kiseki". The coordinate string information is then output to the host computer.

On the other hand, FIG. 15 shows coordinate strings which were transmitted from the coordinate input device 401 according to the embodiment to the host computer when inputting handwritten Chinese characters " " with the pen appliance in the same manner as in FIG. 14, in which 701 is a point indicative of selected coordinates and 702 represents a pseudo tangent vector added to the point 701. In FIG. 15, the pseudo tangent vector 702 is lengthened to facilitate the description.

Such a structure of the embodiment permits the host apparatus to easily execute curve interpolation using the coordinate data from the coordinate input device 401.

FIG. 16 shows a comparison between operational procedure for executing conventional curve interpolation (steps S801 through S809) and operational procedure for executing curve interpolation according to the embodiment. The former operation is performed in the conventional curve interpolator 108 utilized in the third embodiment of FIG. 9 for calculating the curve as a curve function based on the coordinate string information from the coordinate input device 101. The latter operation is performed for calculating the curve as a curve function based on the coordinate string information which additionally contains information indicative of pseudo tangent vectors at respective coordinate points according to the embodiment.

In FIG. 16, steps S801 and S807 are commonly used in both the calculation systems for reading data of coordinate strings, and steps S802 and S808 are commonly used for calculating the distance between data to be made approximate. In common curve approximation using a three-dimensional spline curve, a matrix calculation technique is generally used to calculate a tangent vector at each data point from each data of coordinate strings. Steps S803 through S805 show the processing steps of calculating the tangent vector at each data point using such a matrix calculation technique. Among the processing steps, however, the more the number of data to be processed in these steps, i.e., the number of target coordinates increases, the more the work load on the host apparatus increases. In contrast, the calculation technique according to the embodiment can directly enter the final step S809 (step S806 in the conventional) of calculating a spline curve without any matrix calculation since the pseudo tangent vector at each data point has been already obtained.

Finally, FIG. 17 shows an exemplary output of the host computer when inputting handwritten Chinese characters "軌跡" with the pen, in which curve interpolation according to the embodiment has been already done.

As discussed above, according to the embodiment, the oversampling unit 403 in the coordinate input device 401 can obtain a pseudo tangent vector at each data point, and this makes it possible to easily execute curve interpolation with less work load on the host apparatus than the conventional. Accordingly, the processing can be performed with higher accuracy and at a higher rate than the conventional calculation technique which involves a sequence of matrix calculating steps.

Further, according to the coordinate input device of the embodiment, the coordinate discriminator selects data among the coordinate data detected based on the coordinate information and by the calculation means consisting of the angle processor and the counter so that only the data selected by the coordinate discriminator can be output to the transmitter. For this reason, the coordinate input device can transmits the coordinate information to the host apparatus with less information content but as effective coordinate information. This permits the host apparatus to process the coordinate information properly with higher accuracy and at a higher rate than the conventional.

The coordinate input device also includes the oversampling unit so that the distance difference between two data can be output to the host apparatus, one data from the coordinate detector and the other data obtained by the oversampling unit after a slight delay since the coordinate detector obtained the data. This also permits the host computer to process coordinate information more properly with higher accuracy and at a higher rate.

(Fifth Embodiment)

At first, a description will be made to sampling timing and interpolation between sampling points according to a fifth embodiment.

Figure 20:
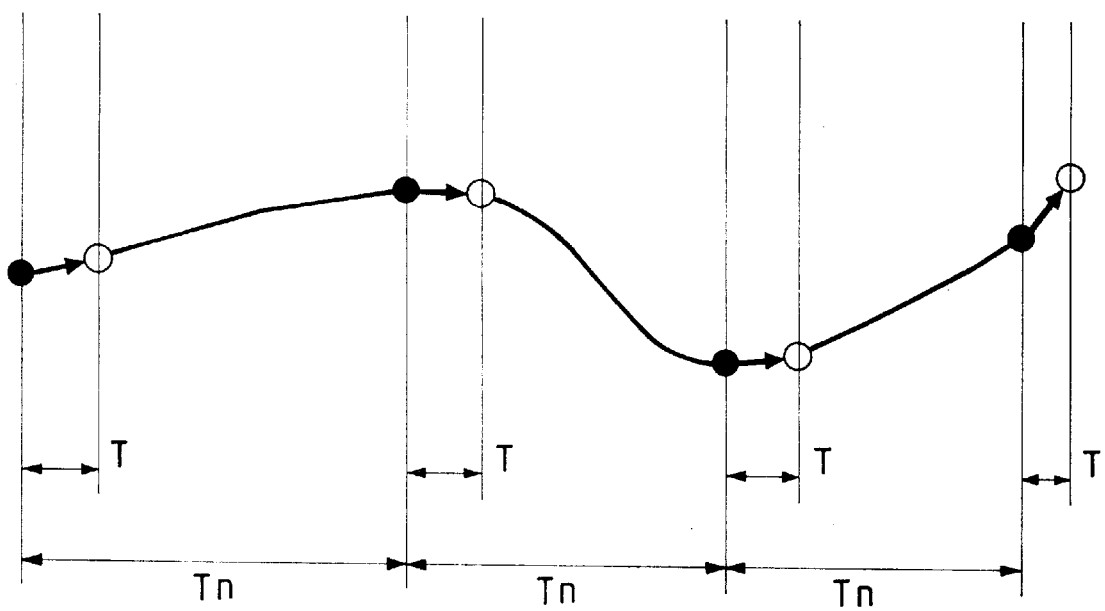
FIG. 20 is an illustration for explaining sampling timing in a fifth embodiment of the present invention.

FIG. 20 is an illustration for explaining sampling timing in the fifth embodiment. In the embodiment, difference approximation with a first difference method is used to calculate data corresponding to a tangent vector based on the input from a digitizer.

Assuming that the number of normal sampling is 100 point/sec., the sampling interval will be 10 msec. In FIG. 20, Tn is a sampling cycle and each black circle represents data point sampled with the sampling cycle Tn. A time interval T (e.g., 2 msec.) is then set to be shorter than the sampling cycle Tn, so as to get a sample of data again at the end of the time interval T after the normal sampling was done with the cycle Tn.

If a coordinate pair obtained by the normal sampling of the cycle Tn is Ps (xs, yx) and a coordinate pair obtained by the supplemental sampling at the end of the time interval T after the normal sampling was done is Pa (xa, ya), each tangent vector between Ps and Pa (indicated by the arrow in FIG. 20) will be given by the following difference approximation:

$$Ps'=(Pa-Ps)/T*\alpha.$$

This can be expressed in each coordinate as:

$$(px'=(xa-xs)/T*\alpha,\ py'=(ya-ys)/T*\alpha),$$

where T is the time interval as mentioned above and represents a time difference between Pa and Ps. $\alpha$ is a constant and may be properly defined in each curve processing system.

For example, in the three-dimensional spline approximation, each tangent vector P'sk, P'sk+1 at two points Pk, Pk+1 indicative of data both obtained by normal sampling is first calculated in a manner discussed above. Then, a difference between two points is calculated using t as a parameter as follows:

$$Pk(t)=[F][G],$$

$$[F]=[F1(t)F2(t)F3(t)F4(t)], \text{ and}$$

$$[G]T=[Pk\ Pk+1\ P'sk\ P'sk+1],$$

where [F] is a matrix of blending functions of the curve, and [G]T represents that it is transposed.

In the conventional technique for three-dimensional spline approximation, only the normally sampled points are used to calculate each vector corresponding to [G] through a sequence of calculation such as matrix calculation. This requires a lot of processing time and therefore makes it difficult to process data in real-time display. In contrast, the embodiment is configured to get a sample of data again at the end of a short time interval after the normal sampling was done with the normal sampling cycle. For this reason, an approximate value of a tangent vector at the normally sampled coordinate point can be obtained in a short time. The use of such a tangent vector facilitates faithful reproduction of the input trace.

The embodiment also simplifies the procedure for curve approximation and therefore enables the host apparatus to output a faithfully reproduced trace. This makes it possible to reduce the number of sampling data conventionally required. Since the number of data can be reduced with the same display quality, the work load on the host apparatus can be also reduced.

In this case, there may be less or no difference in amount of data transmission, even if the number of sampling data is cut in half, as long as the same amount of data is used for difference approximation.

However, the sampling time for difference approximation is shorter than the normal sampling cycle and therefore requires less data content than that of the normal coordinate data. For example, when the coordinate data obtained by the normal sampling is 16 bits, the amount of difference AX, AY can express several bits or so, thus reducing the amount of data transmission.

Next, application of such a sampling technique to an ultrasonic digitizer is taken by way of example to describe actual operation. The working principle of such an ultrasonic digitizer is disclosed, for example, in JP-B-5-62771 and therefore needs not be discussed in detail.

Figure 21:
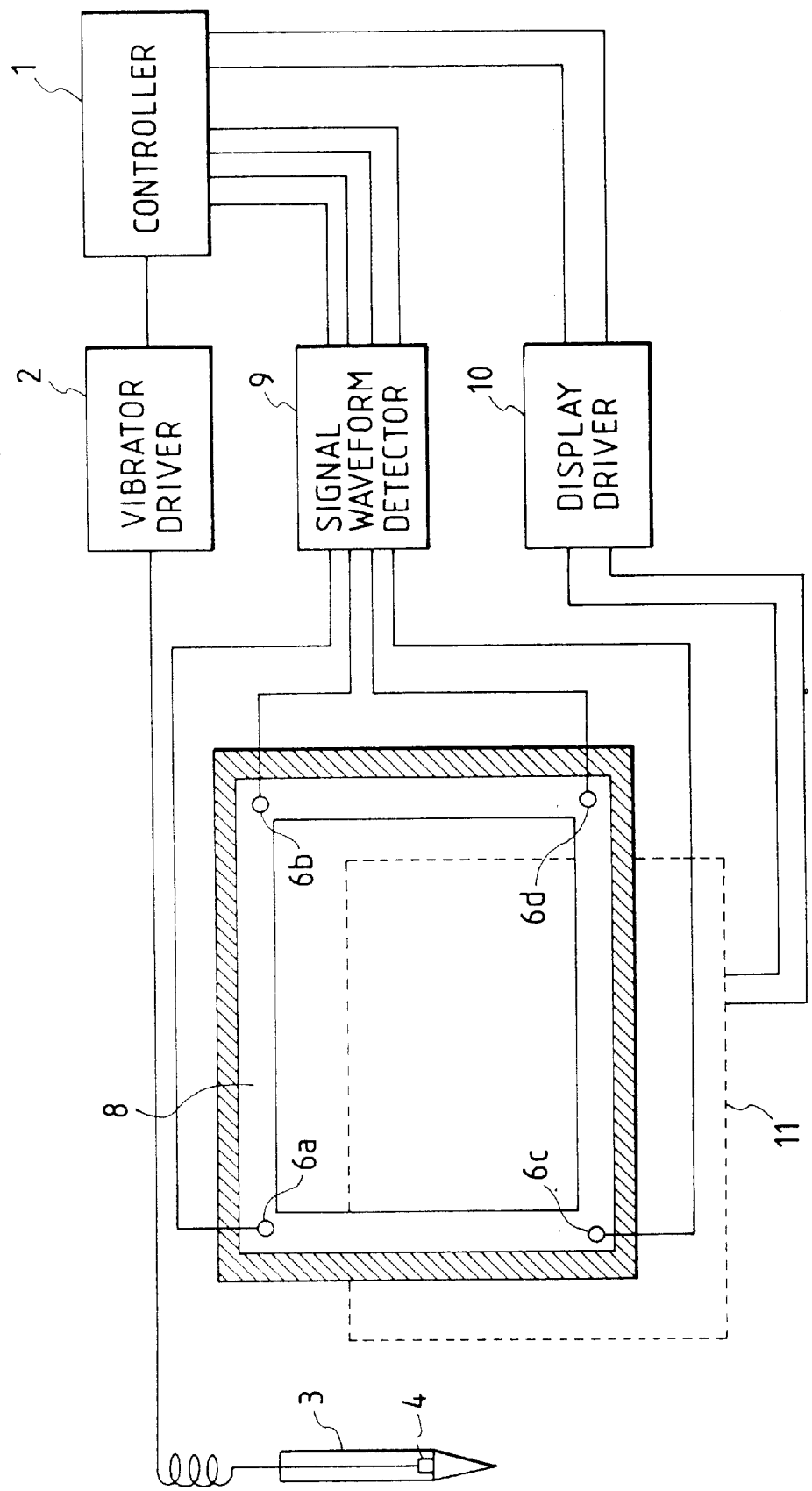
FIG. 21 is a schematic block diagram showing a structure of an ultrasonic digitizer according to the fifth embodiment of the present invention.

FIG. 21 is a schematic block diagram showing a structure of an ultrasonic digitizer according to the embodiment.

In FIG. 21, when a pen 3 is in contact with a surface of a vibration transmitting material 8, a controller 1 drives a built-in vibrator 4 of the pen 3 through a vibrator driver 2. The vibration generated by the vibrator 4 spreads into the material 8 at an inherent propagation rate and is converted into electric waveforms (signal waveform) by sensors 6a to 6d provided at four corners. The signal waveforms are detected by a signal waveform detector 9 and transmitted to the controller 1. The controller 1 measures the time after the vibrator 4 started vibrating until the vibration reaches the respective sensors 6a to 6d, and calculates each distance between the pen 3 and the sensors 6a to 6d from the measured time and the propagation velocity of the vibration transmitting material 8 previously measured.

In the above reference, JP-B-5-62771, among several propagation time applications, a propagation delay time is used for calculating the distance, the propagation delay time determined by group velocity and phase velocity. The calculated distance between the pen and each sensor can be used, based on the Pythagorean proposition, to produce data indicative of the present coordinate position at which the pen 3 is in contact with the vibration transmitting material 8.

The controller 1 then calculates an input trace from the input coordinate position and displays it on a display 11 such as a liquid crystal display through a display driver 10.

Such a coordinate detecting operation can be repeated every normal sampling cycle, e.g., every 10 [msec.], to detect normal coordinate data (marked with black circles in FIG. 20). The operation can be also repeated at the end of the time interval T (2 msec. in the embodiment) after the normal sampling was done so as to get a sample of data again, thus obtaining data corresponding to a tangent vector as discussed above. The operation may be carried out under control of the controller 1 using a control program. The control program will be described below in further detail with reference to FIG. 22.

Figure 22:
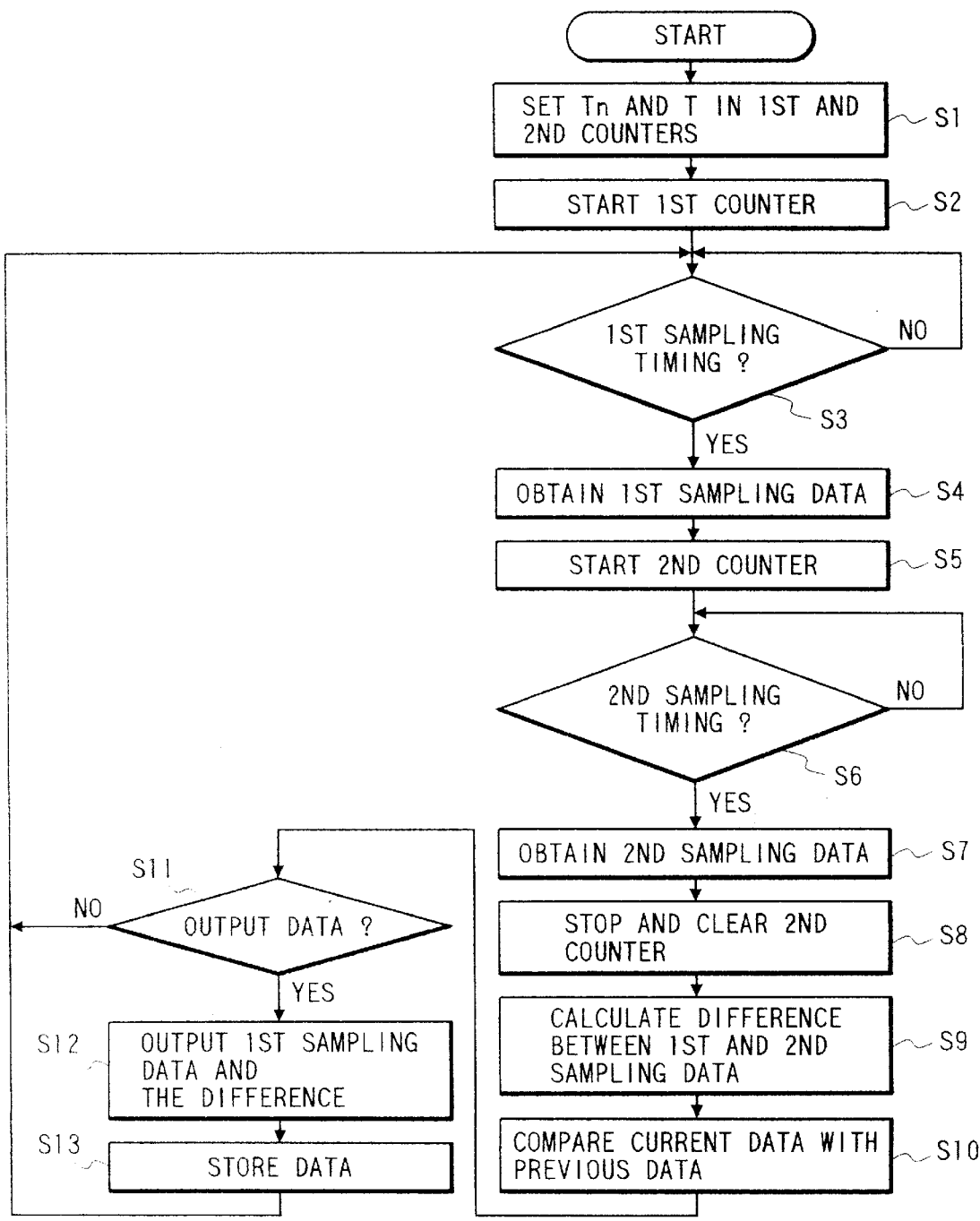
FIG. 22 is a flowchart showing operation in the fifth embodiment of the present invention.

FIG. 22 is a flowchart showing operation in the embodiment. The control program used herein is stored in a ROM, not shown, and executed by an unillustrated CPU, the ROM and the CPU both incorporated in the controller 1. Alternatively, the control program may be supplied from a storage medium such as a floppy disk to the apparatus.

At first, the sampling cycle Tn and the time interval T are set at step S1. For example, when an internal counter of the controller 1 is used for sampling of 100 points/sec., the count may be set to a cycle of 10 [msec.] as well as set to a special timing at which supplemental sampling can be done. In the embodiment, a first counter counting 1 msec clock is set to "10", while a second counter counting a time interval T is set to "2 (T=2 msec.)". At the subsequent step S2, the first counter starts normal sampling with the normal cycle Tn. Subsequently, the first counter continuously repeats counting until the power is turned off.

At step S3, the first counter is checked to determine whether the present timing is first sampling timing, i.e., whether it is sampling timing of the cycle Tn. If not the first sampling timing, the control procedure provides a feedback loop and waits until the first sampling timing appears. If it is the first sampling timing, the control procedure goes to step S4 and first sampling data is obtained. Thus, the normal sampling of the cycle Tn is performed.

After the end operation of the first sampling, the second counter starts at step S5 and determines second sampling timing. The second counter is configured to count a time interval T as mentioned above. If the time interval T is 2 [msec], the second counter will be required to monitor whether 2 [msec] has elapsed or not. At the subsequent step S6, it is determined whether the time interval T has elapsed, and if not elapsed, the control procedure provides a feedback loop. If once the time interval T has elapsed, the control procedure goes to step S7 and second sampling is performed for obtaining second data. After the second data was obtained, the second counter is stopped and cleared at step S8.

Then, a difference between the first data and the second data is calculated at step S9. As discussed above, the first data is first sampling data obtained at sampling timing of the cycle Tn and the second data is second sampling data obtained at the end of the time interval T after the first data was obtained. At the subsequent step S10, the current data is compared with the previous output data and determined as to whether or not the current data should be output. The determination is made through several comparison steps (not shown) at which several comparative elements are used such as the changed amount from the previous output data, the length or angle, sampling frequency between the current data and the previous output data, and the number of skipped data. Thus, points (data points) are extracted from the sampling data and output, so that the data content to be processed can be reduced, thereby carrying out high speed operation.

Figure 23:
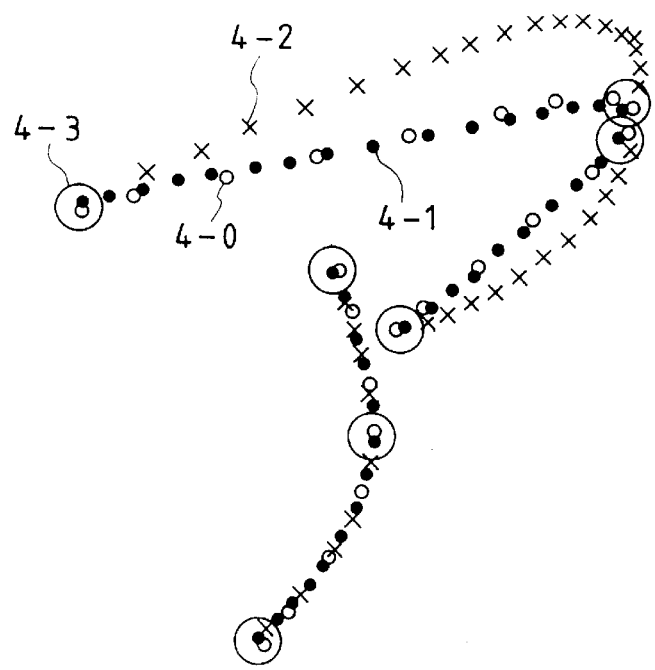
FIG. 23 is an illustration of exemplary handwritten input in the fifth embodiment of the present invention.

For example, the previous output data is stored in the RAM, not shown, in the controller 1 for comparison with the current sampling data. At this time, an angle between the current data and the previous output data may be detected. In this case, the current sampling data is adopted only when the angle is a predetermined angle or more (e.g., 30 degree or more). FIG. 23 shows a concrete example of such operation using a Japanese character "ア", pronounced "a". In FIG. 23, a point 4-0 marked with a white dot is sampling data, points 4-3a to 4-3g each marked with a white circle are data used as data points, and a point 4-1 marked with a black dot represents the result of interpolation. As shown in FIG. 23, there is less change at the beginning of the character (at the beginning of the first stroke), the sampling data are not adopted as data points, i.e., all the points from 4-3a to 4-3b are not used as data points.

When it is determined whether or not the sampling data is adapted only from the angle change, the data point may not be output for quite a long time such as to be independent of any vector. It is therefore desirable, when the number of non-selected sampling points (skipped sampling points) became a predetermined value or more, to use the subsequent sampling data as a data point irrespective of the angle change. For example, the data point 4-3b was adopted due to the number of skipped sampling points over the predetermined value, whereas the data point 4-3c was adopted due to a large angle change. Although this determination used the number of skipped sampling data as a criterion, it may use the distance between a position of the previous output data and a position of the current sampling data. In this case, it is required to calculate the distance between data, but not count the sampling data to be skipped.

Any other criterion may be also used to determine whether the data point should be adopted or not.

As a result of the determination at step S10, if the determination was made at step S11 that the current data is data not to be output, the control procedure returns to step S3 and the next sampling is started. If the first data currently checked is data to be output, the first data and the associated difference data are output to an unillustrated host apparatus at step S12.

After the data output to the host apparatus is then stored in an unillustrated memory of the controller 1 (step S13) for the next determination, the control procedure returns to the sampling loop. Although the determination at step S10 was concretely described above, the present invention is not limited thereto, and the determining method and criterion may be selected properly according to the system.

As mentioned above, FIG. 23 is an illustration of exemplary handwritten input to which the embodiment is applied. In FIG. 23, there are shown two display examples, one an interpolation example 4-2 (marked with crosses) which was interpolated by a three-dimensional spline technique using only the normal sampling data, and the other an interpolation example 4-1 (marked with black dots) according to the embodiment which was interpolated using finite differences. A comparison between the examples shows that the representation 4-1 (black dots) using the difference data is almost equal to the actual handwritten input (marked with white dots). In contrast, the representation 4-2 (crosses) using the three-dimensional spline technique is largely deviated from the actual handwritten input (white dots).

Further, in the technique using the finite differences, computing time can be reduced because there is no need to execute a sequence of matrix calculation, and this permits a very high-speed display. Furthermore, the actual handwritten input (4-0) can be approximately reproduced only by using, at steps S10 and S11, the angle change of the coordinate sampling point (4-0) and the data points (4-3a through 4-3g) extracted according to a criterion such as the number of data, so that the data content can be also reduced to a degree.

Although the three-dimensional spline was taken by way of example to describe the embodiment, the interpolated curve is not limited thereto, and other curve functions such as Bezier curve and B-spline may be applicable.

The embodiment used a time relationship in which the difference sampling point is located behind the corresponding sampling point, but the present invention is not limited by the embodiment. For example, the different sampling point may be located before the corresponding sampling point.

(Sixth Embodiment)

In the fifth embodiment, since one finite difference is obtained in conjunction with one normal sampling point, the obtained difference data is the first order. In contrast, a sixth embodiment described herein is to expand the difference data to the second order.

Such second difference data may be used in a case that a need exists to obtain information corresponding to a derivative of the second order at the point. For example, it is desirably used in a case that continuity should be considered such as contact in a three-dimensional approximate curve.

Figure 24:
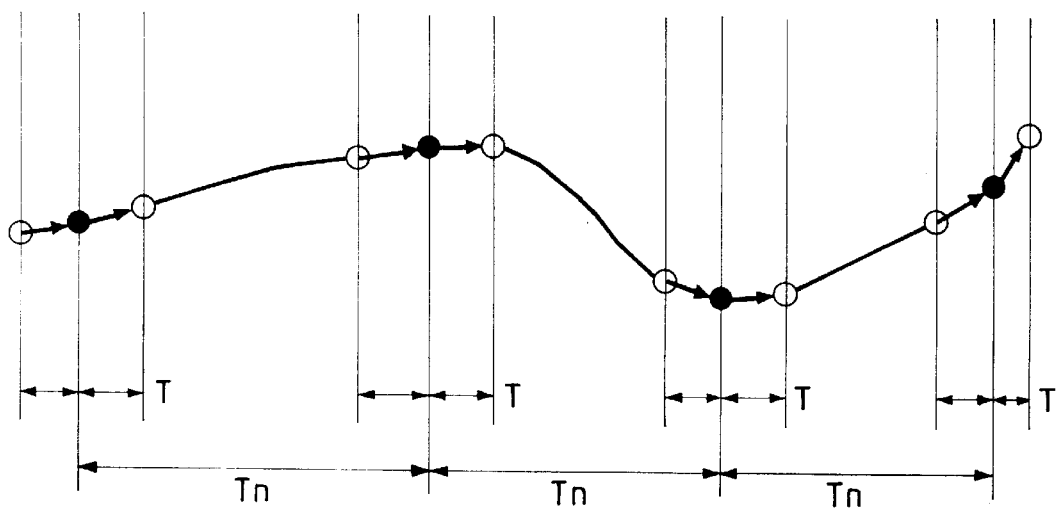
FIG. 24 is an illustration for explaining sampling timing in a sixth embodiment of the present invention.

FIG. 24 shows sampling timing in the sixth embodiment. As shown in FIG. 24, two difference sampling points (marked with the white dots) are provided before and behind one normal sampling point (marked with the black dot). The second difference is then calculated from the obtained data as follows:

$$Ps''=(Pa-2Ps+Pb)/\alpha \times 2T^2,$$

where Pb is the first difference sampling point, Ps is a sampling point, Pa is the second difference sampling point, and $T^2$ represents the square of T. Further, T is a difference sampling time and $\alpha$ is a constant for adjusting the size of a vector as similar to those in the fifth embodiment.

In both the fifth and sixth embodiments, although the coordinate processing is executed as a normal sampling and difference sampling data pair is supplied from the digitizer, the present invention is not limited by the embodiments. For example, the ultrasonic digitizer as shown in the above embodiments may be used at first to read in only time data at respective sampling timing, and then, to execute the coordinate processing and difference calculation. Such configuration control permits an interval between difference sampling points to be set shorter and therefore the sampling time interval to be reduced.

Further, although the above embodiments took an ultrasonic-type coordinate input device by way of example to describe the present invention, any other type of coordinate input device may be applicable. Even in any type of coordinate input device, the same expected results will be obtained as long as sampling is performed using a normal sampling cycle and a time interval for difference sampling in combination in a manner similar to those shown in the above embodiments. Furthermore, the present invention is not limited to the coordinate input device, and is may be applied to other devices such as A/D converters. For example, the use of such devices to get samples of all kinds of sensing signals such as a sound or video signal, heat, light, vibration and moving direction of an object, may realize reduction of data content and faithful reproduction of input data as similar to the above embodiments.

Even in other common sampling devices, each which is configured to get samples of data based on a fixed sampling cycle or cycles, the same expected results may be obtained by performing sampling of plural cycles to output difference data so that processings can be executed using such difference data.

As discussed above, according to the fifth and sixth embodiments, samples of data are obtained with a normal sampling cycle and difference data are obtained at sampling timing before and/or after the normal sampling timing of the normal sampling cycle, so that data corresponding to a derivative of the first order or second order at the point can be obtained. The use of the data corresponding to the derivative may reduce the number of data and hence the work load on the host apparatus as well as enables a faithful reproduction of the input trace.

Particularly, the application to a coordinate input device as discussed in the above embodiments permits addition of data indicative of a directional component to the coordinate data at each sampling point as it was used as only a passing point in the conventional, so that the number of coordinate data can be reduced as well as the faithful reproduction of the input trace can be realized irrespective of display size.

The present invention may be applied to a system including a plurality of apparatuses, or to a single apparatus. Further, it can be applied to a case in which all features are implemented in the system or apparatus by supplying a program. In this case, the present invention will feature a storage medium for storing the program. The program is read out from the storage medium to the system or apparatus so that the system or apparatus can behave in a predetermined manner.

As described above, according to the present invention, interpolation of sampling data can be made more faithfully approximate to the input data with less input data and in simpler computing. For example, the present invention is capable of obtaining a trace more approximate to the input trace indicated by input data with less coordinate information and in simpler computing.

The present invention also enables addition of information which represents a direction of the input trace at each coordinate sampling point. This makes it possible to obtain a trace further approximate to the input trace with less coordinate information and in simpler computing.

What is claimed is:

1. A coordinate input device comprising:
   first sampling means for sampling coordinate data with a predetermined cycle to provide first sample data;
   second sampling means for sampling the coordinate data at least at one moment staggered by a predetermined period from the time when said first sampling means sampled the coordinate data to provide second sample data;
   generating means for generating additional data based on predetermined relationship between the first sample data and the second sample data; and
   output means for providing output data based on the first sample data and the additional data,
   wherein the additional data includes information of a change of the coordinate data.

2. The device according to claim 1, wherein said second sampling means samples the coordinate data at the end of a predetermined time interval after said first sampling means sampled said coordinate data.

3. The device according to claim 1, wherein aid second sampling means samples the coordinate data at predetermined timing before and after said first sampling means sampled said coordinate data.

4. The device according to claim 1 wherein the additional data is data indicative of a difference between the first sample data and the second sample data.

5. The device according to claim 1, wherein each data sampled by said first and second sampling means represents a position of each coordinate point plotting a coordinate trace, and the additional data represents a tangent vector at each input point sampled by said first sampling means.

6. The device according to claim 1 further comprising determination means for obtaining a changed amount between a last output data previously provided by said output means and current data which may be output this time, and determining whether the current data should be provided, wherein said output means provides the current output data based on a result of determination by said determination means.

7. A coordinate input method comprising:
   a first sampling step of sampling coordinate data with a predetermined cycle to provide first sample data;
   a second sampling step of sampling the coordinate data at least at one moment staggered by a predetermined period from the time when said coordinate data was sampled at said first sampling step to provide second sample data;
   a generating step of generating additional data based on a predetermined relationship between the first sample data and the second sample data; and
   an output step of providing output data based on the first sample data and the additional data,
   wherein the additional data includes information of a change of the coordinate data.

8. The method according to claim 7, wherein the additional data is data indicative of a difference between two sampling data from said first and second sampling steps.

9. The method according to claim 7, wherein each data sampled by said first and second sampling steps represents a position of each coordinate point plotting a coordinate trace, and said additional data represents a tangent vector at each coordinate point sampled by said first sampling step.

10. The method according to claim 7 further comprising a determination step of obtaining a changed amount between a last output data previously provided by said output step and current data which may be output at this time, and determining whether the current data should be provided, wherein said output step provides the current output data based on a result of determination by said determination step.

11. A coordinate input device comprising:
   first sampling means for sampling coordinate data with a predetermined cycle, the coordinate data representing a position of each coordinate point on a coordinate trace;
   second sampling means for sampling said coordinate data at least at one moment staggered by a predetermined period from the time when said first sampling means sampled said coordinate data;

generating means for generating additional data for each sampling data obtained by said first sampling means based on sampling data obtained by said first and second sampling means; and formation means for forming an output trace based on input points sampled by said first sampling means and the additional data generated by said generating means, wherein the additional data includes information of a change of coordinate data.

12. A computer readable medium having recorded thereon codes for implementing a computer implementable coordinate input method comprising:

a first sampling step of sampling coordinate data with a predetermined cycle to provide first sample data;

a second sampling step of sampling the coordinate data at least at one moment staggered by a predetermined period from the time when said coordinate data was sampled at said first sampling step to provide second sample data;

a generating step of generating additional data based on a predetermined relationship between the first sample data and the second sample data; and an output step of providing output data based on the first sample data and the additional data, wherein the additional data includes information of a change of the coordinate data.

13. The medium according to claim 12, wherein said additional data is data indicative of a difference between two sampling data from said first and second sampling steps.

14. The medium according to claim 12, wherein each data sampled by said first and second sampling steps represents a position of each coordinate point plotting a coordinate trace, and said additional data represents a tangent vector at each coordinate point sampled by said first sampling step.

15. The medium according to claim 12 further comprising a determination step of obtaining a changed amount between a last output data previously supplied by said output step and current data which may be output at this time, and determining whether the current data should be provided, wherein said output step provides the current output data based on a result of determination by said determination step.

* * * * *

UNITED STATES PATENT AND TRADEMARK OFFICE
CERTIFICATE OF CORRECTION

PATENT NO. : 6,278,445 B1
DATED : August 21, 2001
INVENTOR(S) : Atsushi Tanaka et al.

It is certified that error appears in the above-identified patent and that said Letters Patent is hereby corrected as shown below:

Title page,
Item [56], References Cited, FOREIGN PATENT DOCUMENTS,
"06223139" should read -- 6-223139 --; and
insert: -- 60-222917    11/1985    (JP) .....G06F/03/03 --;
-- 05-233136    9/1993    (JP) .......G06F/03/03 --;
-- 05-159036    6/1993    (JP) .......G06F/15/62 --; and
-- 03-154122    7/1991    (JP) .......G06F/03/03 --.

Column 2,
Line 39, ""/ $\ast$ ","  should read --" $\ast$ ",--.

Column 3,
Line 6, "is" should be deleted; and
Line 48, "thereof" should read -- thereof is --.

Column 4,
Line 32, "a" should be deleted.

Column 5,
Line 18, "approximate" should read -- approximate curve --.

Column 6,
Line 4, "are" should read -- is --; and
Line 67, ""=0.7"" should read -- "-0.7" --.

Column 8,
Line 58, "not remain," should read -- not, --;
Line 59, "If" should read -- If any --; and
Line 66, "are" should read -- is --.

Column 9,
Line 21, "located" should read -- located at a --.

Column 10,
Line 1, "have" should read -- has --.

Column 13,
Line 9, "occurs" should read -- occur --.

UNITED STATES PATENT AND TRADEMARK OFFICE
CERTIFICATE OF CORRECTION

PATENT NO. : 6,278,445 B1
DATED : August 21, 2001
INVENTOR(S) : Atsushi Tanaka et al.

It is certified that error appears in the above-identified patent and that said Letters Patent is hereby corrected as shown below:

Column 14,
Line 22, "transmits" should read -- transmit --; and
Line 36, "to" should read -- of --.

Column 15,
Line 46, "AX, AY" should read -- $\Delta X, \Delta Y$ --.

Column 19,
Line 5, "is" should be deleted.

Column 20,
Line 8, "aid" should read -- said --.

Signed and Sealed this

Thirtieth Day of April, 2002

Attest:

Attesting Officer

JAMES E. ROGAN
*Director of the United States Patent and Trademark Office*